(12) United States Patent
Ima et al.

(10) Patent No.: US 7,357,210 B2
(45) Date of Patent: Apr. 15, 2008

(54) VEHICLE POWER TRANSMISSION SYSTEM

(75) Inventors: Akihiro Ima, Hyogo (JP); Toshiyuki Hasegawa, Hyogo (JP); Kazuhiko Ohtsuki, Hyogo (JP); Kenichi Yasui, Hyogo (JP)

(73) Assignee: Kanzaki Kokyukoki Mfg. Co., Ltd. (JP)

( * ) Notice: Subject to any disclaimer, the term of this patent is extended or adjusted under 35 U.S.C. 154(b) by 337 days.

(21) Appl. No.: 11/097,162

(22) Filed: Apr. 4, 2005

(65) Prior Publication Data

US 2005/0224262 A1    Oct. 13, 2005

(30) Foreign Application Priority Data

Apr. 8, 2004  (JP) .............................. 2004-114275
Apr. 30, 2004 (JP) .............................. 2004-135568

(51) Int. Cl.
   *B60K 17/34* (2006.01)
(52) U.S. Cl. ....................... 180/233; 180/245
(58) Field of Classification Search ................ 180/233, 180/245
   See application file for complete search history.

(56) References Cited

U.S. PATENT DOCUMENTS 3,869,013 A * 3/1975 Pagdin et al. ............... 180/249
4,903,791 A * 2/1990 Cameron et al. ........... 180/252

2001/0004031 A1  6/2001 Hasegawa
2005/0049103 A1  3/2005 Pecnik et al.

FOREIGN PATENT DOCUMENTS

GB          460619       2/1937
JP       2001-182562     6/2001
WO      WO 03066362     8/2003

* cited by examiner

*Primary Examiner*—Kevin Hurley
(74) *Attorney, Agent, or Firm*—Sterne, Kessler, Goldstein & Fox P.L.L.C.

(57) ABSTRACT

A vehicle power transmission system comprises: a prime mover mounted on a vehicle body frame; a first axle and a first transaxle for driving the first axle disposed at one of front and rear portions of a vehicle, the first transaxle having a first input part projecting outward therefrom, and the first transaxle having a power take-off shaft projecting outward therefrom opposite to the first input part; a speed-changing transmission drivingly interposed between the prime mover and the first input part; a second axle and a second transaxle for driving the second axle disposed at the other rear or front portion of the vehicle, the second axle having a second input part; and a power take-off train extended from a leading part to an ending part. The prime mover is disposed between the first transaxle and the second transaxle in a fore-and-aft direction of the vehicle. The leading part of the power take-off train is drivingly connected to the power take-off shaft, and the ending part of the power take-off train is drivingly connected to the second input part. The leading part of the power take-off train is separated from the first transaxle and laterally offset from the prime mover.

21 Claims, 30 Drawing Sheets

VEHICLE POWER TRANSMISSION SYSTEM

BACKGROUND OF THE INVENTION

1. Field of the Invention

The present invention relates to a power transmission system for a vehicle, such as a cart or utility vehicle having a cargo deck, having front and rear transaxles and a prime mover disposed between the transaxles, wherein the power transmission system includes a power take-off from one of the front and rear transaxles, which is driven by the prime mover, and transmits the power to the other transaxle.

2. Related Art

Conventionally, there is a well known vehicle comprising a first transaxle for driving a first axle and a second transaxle for driving a second axle, the first and second transaxles being distributed before and behind a prime mover, such as an internal combustion engine, supported by a vehicle body frame. An input part of the first transaxle is disposed on one of left and right sides of the first transaxle so as to be drivingly connected to the prime mover through a transmission such as a continuously variable transmission (CVT). A power take-off part (a PTO part) is provided on the other right or left side of the first transaxle opposite to the first input part so as to be drivingly connected to an input part of the second transaxle through bevel gears and a propeller shaft, or so on. For example, such a vehicle is disclosed in the U.S. patent application Ser. No. 2001-4031 and the Japanese Patent Laid Open Gazette 2001-182562.

The first transaxle must be constructed so as to have the PTO part. Furthermore, the PTO part must be considerably laterally long, so that a drive train (such as a propeller shaft) extended from the PTO part to the input part of the second transaxle can be prevented from interfering with the prime mover between the first and second transaxles. Therefore, the first transaxle is complicated and expanded laterally, thereby increasing the cost.

To prevent the lateral expansion of the PTO part, it may be noticed that the drive train from the PTO part is just vertically offset from the prime mover. However, if the drive train is disposed below the prime mover, the vehicle may have insufficient ground clearance. Furthermore, the height of the first axle of the first transaxle and the transmission (CVT) restrain the raising or lowering of the PTO part. As a result, even if the drive train extended from the PTO part to a space above or below the engine is slanted steeply as far as possible, the vehicle still requires a considerably large space between the engine and the first transaxle in the fore-and-aft direction of the vehicle, thereby preventing the longitudinal length of the vehicle from being minimized. Further, there are many vehicles in each of which an operator's operation part is disposed between the prime mover and the second transaxle in the fore-and-aft direction. With regard to such a vehicle, the power transmission system for transmitting power from the PTO shaft of the first transaxle to the input part of the second transaxle must be arranged so as to secure enough space for the operation part.

These are the reasons why the conventional PTO part formed on the first transaxle is laterally elongated so that the drive train from the PTO part is laterally offset from the prime mover.

Further, the first transaxle may be disposed upright so as to reduce the fore-and-aft length of the vehicle. In this case, the intermediate shaft of the first transaxle is disposed above the first axles so that the intermediate shaft becomes considerably higher than the input part of the second transaxle. Accordingly, the bend angle of a universal joint used for connecting the intermediate shaft of the first transaxle to the input part of the second transaxle becomes large so as to increase intrusive noise and reduce comfort of the vehicle.

If a power take-off device for transmitting power from the first transaxle to the second axle, instead of the PTO part formed on the first transaxle, is separated from the first transaxle and laterally offset from the engine, the only requirement of the first transaxle is that one of transmission shafts in the first transaxle is simply extended so as to serve as a PTO shaft, thereby prompting standardization and cost-reduction of the first transaxle. Further, such a standardized first transaxle is desirable so as to be applicable to not only the four-wheel drive vehicle having the second axle driven by the first transaxle but also a two-wheel drive vehicle, whose second axle is not driven. If the first transaxle is used for a two-wheel drive vehicle, the above-mentioned PTO part does not have to be formed on the casing of the first transaxle. Further, it is preferable that the outwardly projecting PTO shaft and the opening for passing the PTO shaft are removed from the casing of the first transaxle when the first transaxle is used for a two-wheel drive vehicle.

SUMMARY OF THE INVENTION

According to the present invention, a vehicle power transmission system comprises: a prime mover mounted on a vehicle body frame; a first axle and a first transaxle for driving the first axle disposed at one of front and rear portions of a vehicle, the first transaxle having a first input part projecting outward therefrom, and the first transaxle having a power take-off shaft projecting outward therefrom opposite to the first input part; a speed-changing transmission drivingly interposed between said prime mover and said first input part; a second axle and a second transaxle for driving the second axle disposed at the other rear or front portion of the vehicle, the second axle having a second input part; and a power take-off train extended from a leading part to an ending part. The prime mover is disposed between the first transaxle and the second transaxle in a fore-and-aft direction of the vehicle. The leading part of the power take-off train is drivingly connected to the power take-off shaft, and the ending part of the power take-off train is drivingly connected to the second input part. The leading part of the power take-off train is separated from the first transaxle and laterally offset from the prime mover.

Due to the power take-off train separated from the first transaxle, the same first transaxle can be also used for a two-wheel drive vehicle in which the first axle is driven by the first transaxle and the second axle is not driven. One of rotary shafts in the first transaxle can project outward so as to serve as the power take-off shaft of the first transaxle. Therefore, the first transaxle can be standardized so as to provide a simple, compact and economical vehicle. Also, due to the lateral offset of the power take-off train from the prime mover, power can be efficiently and smoothly transmitted from the first transaxle to the second transaxle.

Preferably, the power take-off train further comprises a cabinet incorporating the leading part. The cabinet is attached to one of left and right side-plate portions of the vehicle body frame. Accordingly, the cabinet requires no part other than the vehicle body frame to be settled, thereby saving the parts count and being surely laterally offset from the prime mover.

Further preferably, the cabinet is attached to the vehicle body frame through a vibration proof member. Accordingly, the vibration transmitted from the first transaxle through the PTO shaft to the leading part is attenuated and prevented from being propagated to the vehicle body frame, thereby suppressing the vibration of the whole vehicle.

Preferably, the cabinet is formed integrally with an axle support member supporting the first axle. Accordingly, the cabinet can be easily attached together with the axle support member to the vehicle body frame.

Further preferably, the cabinet is fixed to the axle support member for the first axle so as to be movable along a longitudinal direction of the first axle. Accordingly, an error of assembling the cabinet in the vehicle can be corrected easily.

Preferably, the leading part is drivingly connected to the power take-off shaft through a flexible coupling. Due to the flexible coupling, accuracy in the axial centering of the leading part (such as an input shaft) of the power take-off train to the power take-off shaft of the first transaxle can be reduced, while the leading part, especially attached to the vehicle body frame as mentioned above, must be isolated from vibration to the utmost and the first transaxle is subjected to relatively large vibration.

Alternatively, preferably, the leading part is drivingly connected to the power take-off shaft through a universal joint. Due to the universal joint, the power take-off shaft of the first transaxle is allowed to vibrate relative to the leading part (such as the input shaft) of the power take-off train, and the tolerance of error in the axial centering of the leading part to the power take-off shaft can be increased so as to enable the above-mentioned integration of the cabinet with the axle support member supporting the first axle.

Preferably, the ending part is disposed lower than the leading part. Accordingly, a vehicle, in which the power take-off shaft of the first transaxle must be disposed higher than the input part of the second transaxle, can employ the power transmission system so as to have the above-mentioned features and effects.

In association with the arrangement of the ending part lower than the leading part, further preferably, the power take-off train is extended from the leading part to the ending part laterally inward of the vehicle body frame along a substantially slanted straight line, thereby optimizing the power transmission efficiency thereof.

In association with the arrangement of the ending part lower than the leading part, further preferably, the leading part includes a bevel gear, and the ending part includes a universal joint. The power take-off train comprises a propeller shaft interposed between the leading part and the ending part. Due to the bevel gear, the leading part drivingly connects the power take-off shaft to the propeller shaft smoothly, even if the propeller shaft is disposed perpendicularly or acutely against the power take-off shaft. Also, due to the universal joint, the ending part surely drivingly connects the propeller shaft to the input part of the second transaxle, even if the propeller shaft is disposed acutely against the input part of the second transaxle.

Further preferably, the propeller shaft is extended from the leading part to the ending part laterally inward of the vehicle body frame along a substantially slanted straight line, thereby optimizing the power transmission efficiency thereof.

In association with the arrangement of the ending part lower than the leading part, preferably, the power take-off train further comprises a transmission direction changing part between the leading part and the ending part, in substantially the same height as the ending part. Accordingly, a part of the power take-off train between the leading part and the transmission direction changing part to be laterally offset from the prime mover is vertically sloped, and a part of the power take-off train between the transmission direction changing part and the ending part is extended substantially horizontally so as to secure a large space thereabove.

In association with the arrangement of the transmission direction changing part, preferably, an operation part of the vehicle is disposed above a part of the power take-off train between the leading part and the ending part. Due to the horizontal part between the transmission direction changing part and the ending part below the operation part, the operation part can have a low and flat bottom surface so as to ensure a sufficiently large space above the bottom surface for comfortable and easy operation.

In association with the arrangement of the transmission direction changing part, preferably, a third axle is disposed near the transmission direction changing part so as to be driven by the transmission direction changing part inputting power from the power take-off train, thereby providing a multi-wheel (six-wheel) vehicle having three drive axles aligned in the fore-and-aft direction. Due to the arrangement of the third axle near the transmission direction changing part, component members of the transmission direction changing part and component members for transmitting power to the third axle are disposed intensively and compactly. A lateral rotary shaft may be provided in the transmission direction changing part so as to simply and economically ensure a laterally extended drive train for transmitting power to the third axle in the vehicle body.

In association with the arrangement of the transmission direction changing part, preferably, when viewed in plan, a first part of the power take-off train from the leading part to the transmission direction changing part is extended in a substantially fore-and-aft direction along one of left and right ends of the vehicle body frame, and a second part of the power take-off train from the transmission direction changing part to the ending part is extended laterally inwardly slantwise of the vehicle body frame. Accordingly, the lateral width of the space for disposing the first part can be reduced to the utmost, thereby securing the compactness of the vehicle.

In association with the arrangement of the transmission direction changing part, the leading part includes a bevel gear, the transmission direction changing part and the ending part include respective universal joints, and the power take-off train comprises: a first propeller shaft interposed between the leading part and the transmission direction changing part; and a second propeller shaft interposed between the transmission direction changing part and the ending part. The bevel gear of the leading part ensures smooth driving connection of the first propeller shaft and the power take-off shaft, which are disposed perpendicular to each other. Also, the universal joint of the transmission direction changing part ensures smooth driving connection of the first and second propeller shafts disposed obtusely from each other, and the universal joint of the ending part ensures smooth driving connection of the second propeller shaft and the second input part of the second transaxle.

In association with the arrangement of the first and second propeller shafts, preferably, the first propeller shaft is extended in a substantially fore-and-aft direction along one of left and right ends of the vehicle body frame, and the second propeller shaft is extended laterally inwardly slantwise of the vehicle body frame, thereby restraining lateral extension of the power take-off train.

In association with the transmission direction changing part having the universal joint, preferably, the vehicle body frame comprises: a first frame part supporting the leading part; and a second frame part supporting the ending part. The second frame part is pivotally connected to the first frame part through a pivot. An axis of the pivot passes through a center of the universal joint of the transmission direction changing part, thereby providing advantage in suspension of wheels for a vehicle.

In association with the arrangement of the transmission direction changing part, alternatively, preferably, when viewed in plan, a first part of the power take-off train from the leading part to the transmission direction changing part and a second part of the power take-off train from the transmission direction changing part to the ending part are extended in a substantially fore-and-aft direction in parallel to each other. Accordingly, the lateral width of a space for laterally offsetting the first part from the prime mover can be reduced. Furthermore, the fore-and-aft extended second part reduces a lateral dead space in the vehicle body near the second part.

In association with the arrangement of the transmission direction changing part, alternatively, preferably, the leading part, the ending part and the transmission direction changing part comprises: respective sprocket shafts extended laterally of the vehicle body frame; and respective sprockets on the sprocket shafts. A first chain is interposed between the leading part and the transmission direction changing part, and a second chain is interposed between the transmission direction changing part and the ending part. Accordingly, the power take-off train can be constructed cheaper than that comprising bevel gears.

Further preferably, the first chain and the second chain are extended in a substantially fore-and-aft direction in parallel to each other, thereby suitably providing the power take-off train.

According to the present invention, a vehicle power transmission system comprises: a prime mover; a laterally extended main drive axle; a transmission casing incorporating an axle drive mechanism for driving the main drive axle, the transmission casing being disposed before or behind the prime mover, and the transmission casing including a laterally extended axle support portion supporting the main drive axle; a belt type transmission device disposed on one of left and right sides of the transmission casing, and drivingly interposed between the prime mover and the axle drive mechanism in the transmission casing; an auxiliary drive axle; and a power take-off casing incorporating a power take-off mechanism for driving the auxiliary drive axle, wherein the power take-off casing is attached onto an end of the axle support portion of the transmission casing on the lateral opposite side to the belt type transmission device.

Accordingly, to transmit power from the axle drive mechanism in the transmission casing to the auxiliary drive axle, only the axle support portion of the transmission casing is used for attaching the power take-off casing, however, the transmission casing need not have a power take-off shaft projecting outward therefrom for transmitting power to the auxiliary drive axle, and need not have an opening for passing the power take-off shaft. In other word, the transmission casing is standardized whether or not the power take-off mechanism for transmitting power from the axle drive mechanism in the transmission casing to the auxiliary drive axle is needed. The power take-off casing is prevented from interfering with the belt type transmission device disposed laterally opposite to the power take-off casing with respect to the transmission casing, and further, a drive train, such as universal joints and a propeller shaft, which is extended from the power take-off casing so as to drivingly connect the power take-off mechanism to the auxiliary drive axle, can be also prevented from interfering with the belt type transmission device and the prime mover. Furthermore, while the level of the main drive axle and the auxiliary drive axle is low in the vehicle (the main drive axle is supported by the axle support portion serving as the lowest portion of the transmission casing), the power take-off casing and the power take-off mechanism therein are disposed at the same level as the main drive axle, so that, if the drive train interposed between the power take-off mechanism and the auxiliary drive axle includes a universal joint, a vertical bend angle of the universal joint can be small so as to reduce vibration and noise and improve comfort of the vehicle.

Preferably, either a cover member for covering the main drive axle or the power take-off casing incorporating the power take-off mechanism for driving the auxiliary axle is selectively attached onto the end of the axle support portion of the transmission casing. Accordingly, the only requirement of the transmission casing to be attached to the power take-off casing for transmitting power to the auxiliary drive axle is removal of the cover member so as to open the end of the axle support portion. On the other hand, the open end of the axle support portion of the transmission casing can be closed by the cover member unless the power take-off casing is attached to the end. Therefore, the transmission casing is standardized whether or not the power take-off mechanism for transmitting power from the axle drive mechanism in the transmission casing to the auxiliary drive axle is needed.

Preferably, the axle drive mechanism in the transmission casing comprises a differential gear unit differentially connecting a pair of left and right main drive axles to each other. The differential gear unit includes a differential cage, which is extended along an outer peripheral surface of the main drive axle into the power take-off casing so as to be drivingly connected to the power take-off mechanism in the power take-off casing. Accordingly, the open end of the axle support portion of the transmission casing, from which the main drive axle projects outward, can also serve as an opening for passing the extended part of the differential cage to be inserted into the power take-off casing and drivingly connected to the power take-off mechanism. Further, as mentioned above, the power take-off casing is attached onto the open end of the axle support portion of the transmission casing. In this way, the transmission casing is standardized whether or not the power take-off mechanism for transmitting power from the axle drive mechanism in the transmission casing to the auxiliary drive axle is needed.

Further preferably, the axle drive mechanism in the transmission casing comprises: a transmission shaft supported in the transmission casing and disposed on the upstream side of the differential gear unit in the transmission casing; and a deceleration drive train drivingly interposed between the transmission shaft and the differential gear unit. The power take-off mechanism in the power take-off casing comprises: an output shaft supported in the power take-off casing for outputting power to the auxiliary drive axle; and a drive train disposed in the power take-off casing and drivingly interposed between the differential cage and the output shaft. The drive train of the power take-off mechanism has an acceleration ratio equal to a deceleration ratio of the deceleration drive train of the axle drive mechanism in the transmission casing.

Accordingly, the rotation speed of the output shaft of the power take-off mechanism is substantially equaled to the rotation speed of an output shaft of a conventional type power take-off mechanism. In this regard, the conventional type power take-off mechanism is disposed in a power take-off casing attached to a transmission casing, and drivingly connected to an intermediate shaft of a transmission in the transmission casing, wherein the intermediate shaft is disposed on the upstream of a differential in the transmission casing. Therefore, if the transmission casing according to the present invention is used as a casing of the above-mentioned first transaxle, the second transaxle can be the same of that suited to the power take-off mechanism using the intermediate shaft in the transmission casing of the first transaxle as a power take-off shaft.

These, other and further objects, features and advantages will appear more fully from the following description with reference to the accompanying drawings.

DETAILED DESCRIPTION OF THE INVENTION

Figure 1:
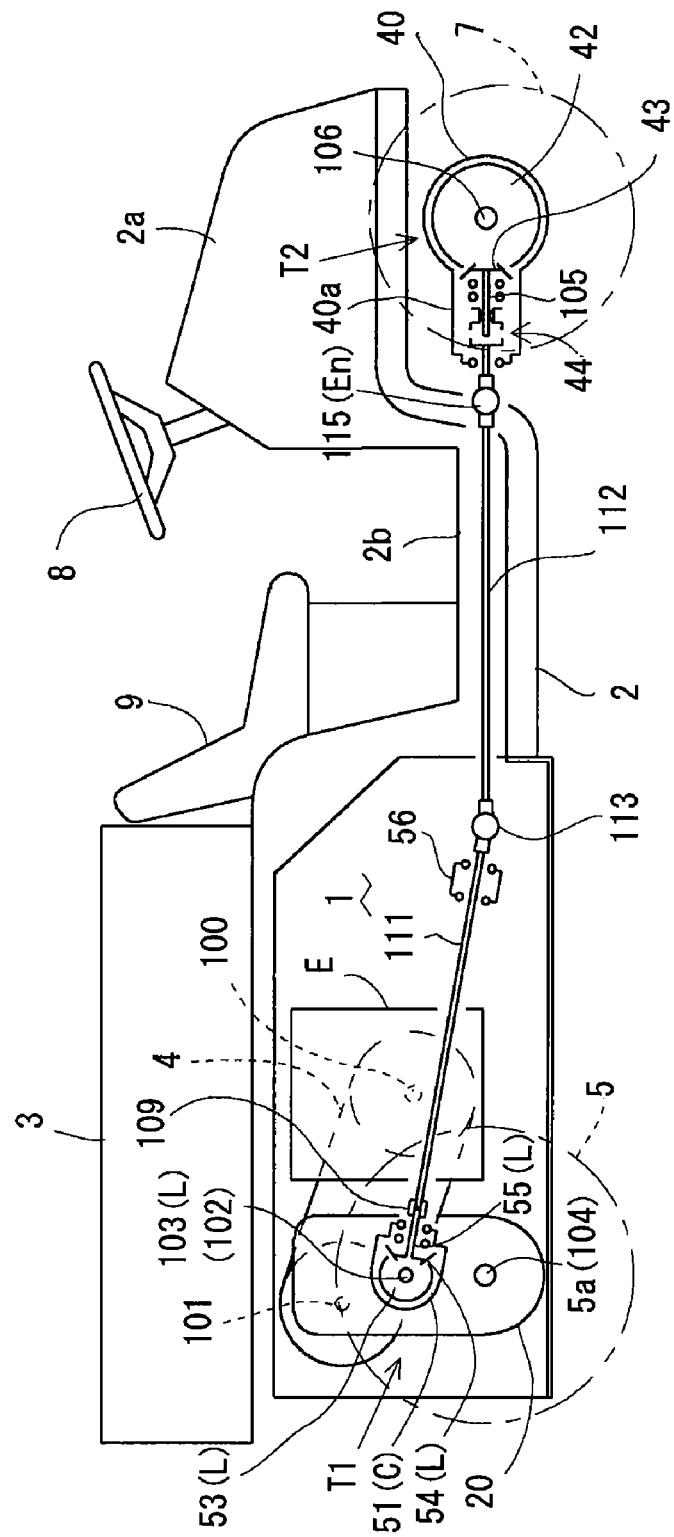
FIG. 1 is a schematic side view of a cart or utility vehicle having a cargo deck as an example of a vehicle having a power transmission system according to a first embodiment of the present invention.

Firstly, explanation will be given on a schematic construction of a cart or utility vehicle having a cargo deck common to FIGS. 1 to 11. A main body of the cart or utility vehicle is constructed by longitudinally connecting a front frame 2 and a rear frame 1. The rear frame 1 comprises a horizontal bottom plate, which is rectangular when viewed in plan, and side plates provided upright on front, rear, left and right ends of the bottom plate. A cargo deck 3 is provided on the upper part of the rear frame 1, preferably to be rotatable upward and downward. The rear frame 1 serves as a support base for the cargo deck 3.

An engine E having a lateral crankshaft, serving as a prime mover, is disposed in the rear frame 1. In this embodiment, an output shaft 100 is projected leftward. A rear transaxle T1, serving as a first transaxle, is disposed behind the engine E, and an input shaft 101 thereof is projected leftward in parallel to the output shaft 100 of the engine. A belt type continuously variable transmission (CVT) 4 drivingly connects the engine output shaft 100 to the input shaft 101 of the rear transaxle T1. The rear transaxle T1 has a later-discussed longitudinal traveling switch mechanism.

The rear transaxle T1 has a pair of left and right axles 104 extended leftward and rightward oppositely. The axles 104 are drivingly connected at outer ends thereof to respective left and right rear wheels 5 disposed outside the left and right side plates of the rear frame 1. Brakes 5b are provided on the respective rear wheels 5. Rear wheel axles 5a, serving as central axes of the rear wheels 5, penetrate respective rear wheel axle support members 6 attached to the respective left and right side plates of the rear frame 1 and project outward therefrom. The rear wheel axles 5a are supported by bearings 6a in the rear wheel axle support members 6. In the rear frame 1, inner ends of the rear wheel axles 5a and outer ends of the axles 104 are formed on outer periphery thereof with splines, and sleeve couplings 108 have inner peripheral splines to be engaged with the splines of axles 5a and 104. The inner end of each of the rear wheel axles 5a and the outer end of each of the axles 104 are spline-fittingly inserted into the couplings 108 from the opposite sides (see FIG. 3), whereby the rear wheel axle 5a and the axle 104 are connected with each other so as to be rotatable integrally. Each of the left and right axles 104 and rear wheel axles 5a has suitable length. In each of the embodiments, because the left and right axles 104 have substantially the same length and the rear transaxle Ti is disposed in the left side of the vehicle, the right rear wheel axle 5a is longer than the left rear wheel axle 5a.

The front half of the front frame 2 is higher than the rear half thereof. A front transaxle T2 serving as a second transaxle is provided at the lateral center below the front half of the front frame 2. The front transaxle T2 has a pair of left and right second axles 106 extended leftward and rightward oppositely. The axles 106 are drivingly connected through universal joints 13 and transmission shafts 14 to respective front wheel axles 7a, serving as central axes of the front wheels 7, disposed outside of the respective left and right sides of the front half of the front frame 2 so as to be steerable (laterally rotatable). A front cover 2a is provided upright on the front half of the front frame 2. An upper rear end portion of the front cover 2a serves as an operation instrument panel, provided thereabove with a steering wheel 8. Stays 2c project from the respective left and right ends of the front half of the front frame 2, and usual suspension mechanisms 107, which comprise coil springs, shock absorbers and the like, are extended from the stays 2c to the front wheel axles 7a so as to suspend the front wheels 7.

Figure 4:
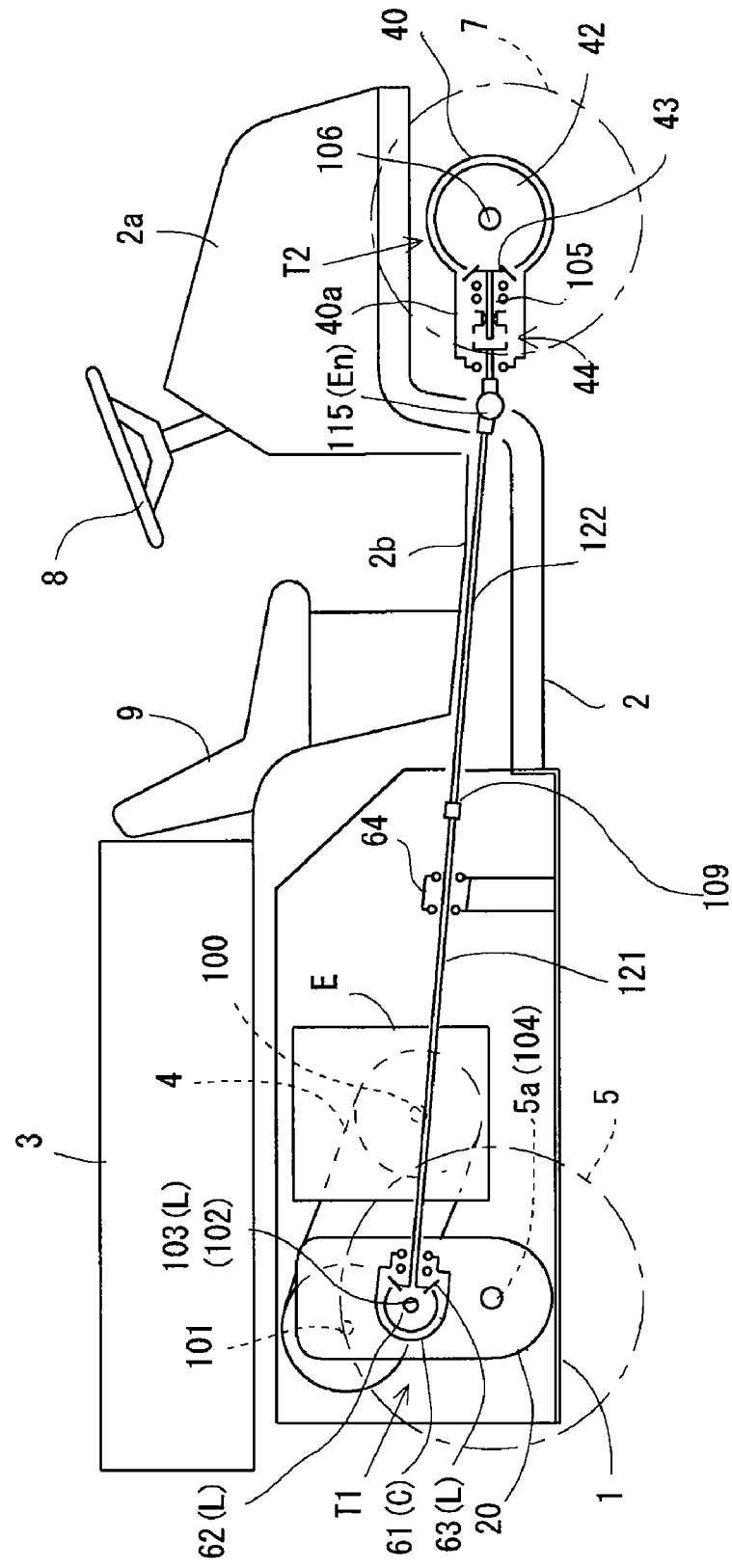
FIG. 4 is a schematic side view of a cart or utility vehicle having a power transmission system according to a second embodiment of the present invention.
Figure 5:
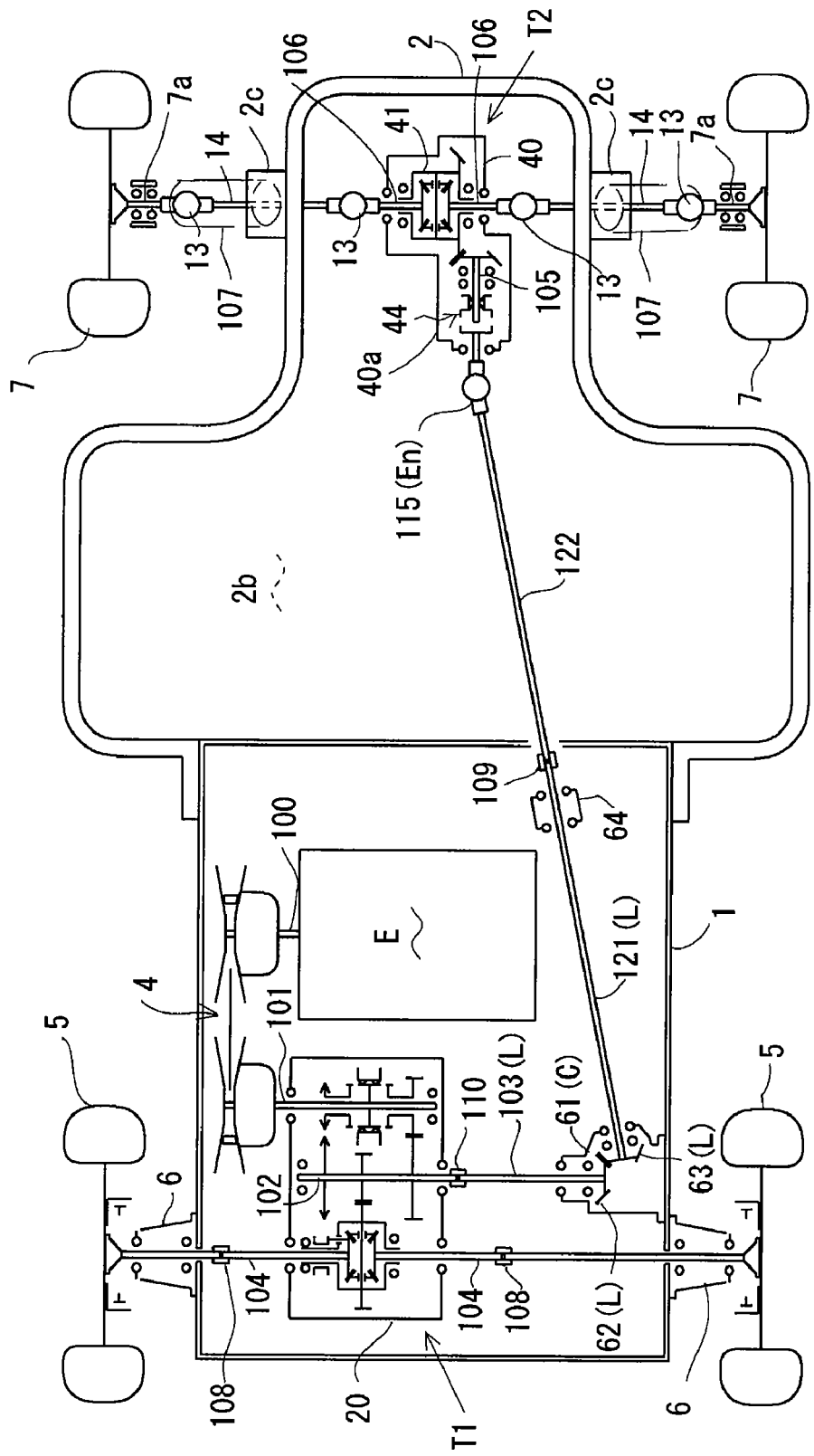
FIG. 5 is a schematic plan view of the cart or utility vehicle of FIG. 4.

A footboard is laid on the rear half of the front frame 2 behind the rear end of the front cover 2a so as to form a horizontal platform 2b (however, in a later-discussed second embodiment shown in FIGS. 4 and 5, the platform 2b has a slant portion above a later-discussed power take-off system). As clearly shown in FIG. 2, the platform 2b is extended laterally outward. An operator's seat 9 is provided upright on the rear end of the front frame 2 (just before the rear frame 1 and the cargo deck 3), and the platform 2b is extended leftward, rightward and forward from the seat 9.

Explanation will be given of the structure of the rear transaxle T1 especially according to FIG. 3. In the vehicle, the rear transaxle T1 has a housing 20 whose bottom end is fixed onto the bottom surface of the rear frame 1 by bolting. The housing 20 pivotally supports the input shaft 101 at an upper part thereof, the left and right axles 104 at the lower part thereof, and an intermediate transmission shaft 102 at the level between the input shaft 101 and the axles 104, so as to extend the shafts 101 and 102 and axles 104 laterally.

In the housing 20, a clutch gear 21 and a clutch sprocket 22 are freely rotatably fitted on respective right and left portions of the input shaft 101. A clutch slider 23 is axially slidably provided on the input shaft 101 between the clutch gear 21 and the clutch sprocket 22, and is engaged with one of the clutch gear 21 and the clutch sprocket 22 so as to integrally rotatably connect the clutch-engaged gear or sprocket to the input shaft 101. In addition, the clutch slider 23 also can be disengaged from the clutch gear 21 and the clutch sprocket 22 so as to prevent power from being transmitted to the axles 104 (a neutral state). The axial position of the clutch slider 23 is shifted by operating an operation member (a switch, lever or the like) provided at a rear end of the front cover 2a or a side of the operator's seat 9 for switching the traveling state of the vehicle among a forward traveling state, a rearward traveling state and the neutral state.

A gear 24 and a sprocket 26 are fixed on the intermediate transmission shaft 102 below the input shaft 101. The gear 24 always engages with the clutch gear 21, and the sprocket 26 is drivingly connected to the clutch sprocket 22 through a chain 25. When power is transmitted to the gears 21 and 24, the intermediate transmission shaft 102 rotated in the direction opposite to the input shaft 101. When power is transmitted to the sprocket 22, 26 and the chain 25, the intermediate transmission shaft 102 rotated in the same direction as the input shaft 101. Accordingly, a mechanical traveling direction switch mechanism is provided with a drive train of the gears 21 and 24 and a drive train of the sprocket 22 and 26 as respective gear trains for forward traveling and rearward traveling.

A final pinion 27 is formed on the intermediate transmission shaft 102 between the gear 24 and the sprocket 26, and engages with a bull gear 28 of a differential gear mechanism provided between left and right axles 104. In the bull gear 28, between the inner ends of the axles 104, a differential pinion shaft 29 is pivotally supported perpendicularly to the axes of the axles 104 (along the diameter of the bull gear 28). A pair of symmetric differential pinions 30 are disposed on the differential pinion shaft 29. Left and right divisional differential cages 31 are provided on opposite sides of the bull gear 28. The inner ends of the differential cages 31 are fixed to the right and left surfaces of the bull gear 28, and the outer ends thereof are pivotally supported together with the axles 104 by bearings 33 provided in left and right side portions of the housing 20. In each of the differential cages 31, a differential side gear 32 fixed onto the inner end of the axle 104 is disposed and engages with the differential pinions 30. Furthermore, a differential lock member 34 is axially slidably provided on one of left and right differential cages 31 (in each of the embodiments, on the left differential cage 31). To differential-lock axles 104, the differential lock member 34 is engaged to the differential side gear 32 disposed in the corresponding differential cage 31.

With regard to the common construction of the front transaxle T2 among the embodiments, the second axles 106 are differentially connected to each other through a differential gear mechanism 41, and an input shaft 105 is provided for receiving power from the rear transaxle T1 so as to drive the differential gear mechanism 41. However, as discussed later, the construction of the input part (such as the direction of the input shaft 105), the drive train structure between the input shaft 105 and the differential gear mechanism 41, the form of the housing and others are changed in correspondence to change of the drive train pattern between rear transaxle T1 and the front transaxle T2, for example, depending upon whether bevel gears and transmission shafts or chains and sprockets are used for the drive train. Therefore, each following embodiment will be described with reference to only its distinctive elements.

In any case, the front transaxle T2 has a clutch (a clutch 44 in FIG. 2 or a clutch 88 in FIG. 9) between the differential gear mechanism 41 and an input part for receiving power from the rear transaxle T1. By engaging the clutch, the rear transaxle T2 is put into a four-wheel drive mode (or a six-wheel drive mode, in a third embodiment shown in FIGS. 6 and 7 or a fifth embodiment shown in FIGS. 10 and 11, where middle wheels 10 are provided) so as to drive the front wheels 7 synchronously with the rear wheels 5. By disengaging the clutch, the rear transaxle T2 is put into a two-wheel drive mode (or a four-wheel drive mode in the embodiment that the middle wheels 10 are provided), where the rear wheels 5 (and the middle wheels 10 in the third or fifth embodiment) are driven by the engine power and the front wheels 7 are rotated freely from the engine power. Alternatively, such a clutch can be provided on any portion of the later-discussed power take-off train on the upstream of the front transaxle T2. However, by providing the clutch in the front transaxle T2 near an operator, a linkage mechanism connecting an operation lever (not shown) to the clutch can be simplified.

With regard to the power take-off train for transmitting power from the rear transaxle T1 to the front transaxle T2, explanation will be given of the common construction among first to fifth embodiments.

One of ends (the right end) of the intermediate transmission shaft 102 of the rear transaxle T1 projects rightward to a short length from the housing 20 (on the lateral opposite side to the input shaft 101 drivingly connected to the CVT 4) so as to serve as a PTO (power take-off) shaft (in the following explanation of the power take-off train, the intermediate transmission shaft 102 is referred to as a PTO shaft 102). The power take-off train includes a leading part L drivingly connected to the PTO shaft 102 and an ending part En drivingly connected to the input shaft 105 of the front transaxle T2, and transmits power from the leading part L to the ending part En. A cabinet C incorporating the leading part is attached to one of left and right side plates constituting the rear frame 1 (in each of the embodiments, the cabinet C is attached to the right side plate disposed laterally opposite to the CVT 4 with respect to the rear transaxle T1 and the engine E) at a distance from the housing 20 of the rear transaxle T1.

In this way, the leading part L of the power take-off train for transmitting power from the PTO shaft of the rear transaxle T1 to the input shaft of the front trans axle T2 is disposed in the cabinet C which is separated from the housing 20 of the rear transaxle T1 and offset leftward or rightward (in each of the embodiments, rightward) from the engine E. Due to the cabinet C the only requirement of the rear transaxle T1 disposed behind the engine E for driving the front wheel axles is to project the intermediate transmission shaft 102 so as to serve as the PTO shaft. Accordingly, a part of the power take-off train extended from the leading part L passes through the left side space of the engine E so as to be prevented from interfering with the engine E.

Figure 3:
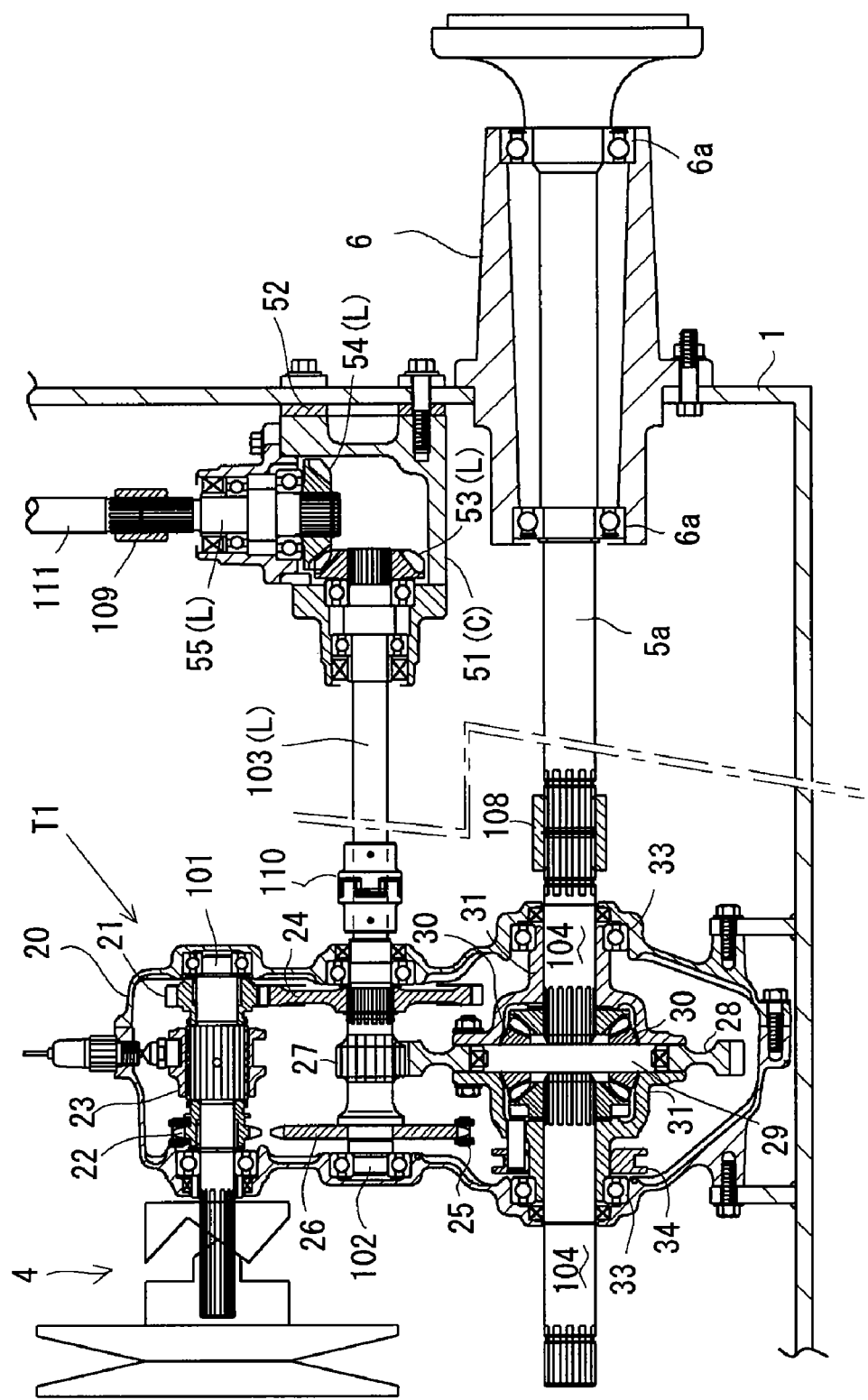
FIG. 3 includes a sectional rear view of a rear transaxle T1 and a rear axle bearing support member, and a sectional plan view of a leading part of a power take-off train according to the first embodiment, wherein the rear transaxle T1 is drivingly connected to the leading part of the power take-off train through a flexible coupling.

As a preferable embodiment of the driving connection between the PTO shaft 102 and the leading part L, especially as shown in FIG. 3, an input shaft 103 of the power take-off train is coaxially extended rightward from the PTO shaft 102, and the shafts 102 and 103 are drivingly connected to each other through a flexible coupling 110. The flexible coupling 110 has an elastic member so as to connect the coaxial two shafts while permitting a deviation of the axes thereof. Namely, at the time of attaching the rear transaxle T1 and the cabinet C on to the rear frame 1, it is not necessary to adjust the positions of the axes of the PTO shaft 102 and the input shaft 103 with high accuracy. The flexible coupling 110 absorbs a vibration of the PTO shaft 102, which is transmitted from the engine E to the rear transaxle T1 through the CVT 4, thereby reducing noise in the power take-off train.

Preferably, a part of the power take-off train passing through the front frame 2 is as low as possible so as to ensure a sufficiently large space for the operation part above the platform 2b on the front frame 2 and to ease an operator's getting on/off the platform 2b. Namely, the ending part En is desired to be lower than the platform 2b. However, since the PTO shaft 102 is disposed higher than the axles 104 for the rear wheels 5, the ending part En must be higher than the platform 2b.

In this regard, in the power take-off train in each of the first, third, fourth and fifth embodiments, a transmission direction changing part is disposed just behind the platform 2b at the substantially same height as the ending part En. A part of the power take-off train between the transmission direction changing part and the ending part En is extended substantially horizontally below the platform 2b. A part of the power take-off train between the leading part L and the transmission direction changing part is vertically slanted (forwardly downward) when viewed in side.

As mentioned above, in association with the leading part L being offset rightward from the engine E, the vertically slanted part between the leading part L and the transmission direction changing part is offset rightward from the engine E, thereby being prevented from interfering with the engine E. On the other hand, the input part of the front transaxle T2 cannot but be disposed on a fore-and-aft line across (through) the engine E in consideration that the differential gear mechanism 41 of the front transaxle T2 is required to be disposed at the substantial lateral center of the vehicle. However, the transmission direction changing part is disposed before the engine E so that the part of the power take-off train between the transmission direction changing part and the ending part En can be extended laterally slantwise in front of the engine E so as to be prevented from interfering with the engine E.

Next, explanation will be given of the first to fifth embodiments shown in FIGS. 1 to 11, with priority given to the construction of the power take-off train from the rear trans axle T1 to the front transaxle T2. Firstly, in the first embodiment shown in FIGS. 1 to 3, a bevel gear box 51 as a cabinet C incorporating the leading part L of the power take-off train is attached to the right side plate of the rear frame 1 through a vibration proof rubber 52, as shown in FIG. 3, so that the vibration caused by the engagement of gears in the bevel gear box 51 is not transmitted directly to the rear frame 1, that is, the vehicle body frame. The bevel gear box 51 is extended laterally inward (leftward) of the vehicle from the inside surface of the right side plate of the rear frame 1.

The laterally extended input shaft 103 is inserted into the bevel gear box 51 through the left end of the bevel gear box 51. A bevel gear 53 is fixed onto the end of the input shaft 103 in the bevel gear box 51. An output shaft 55 is extended forward from the front end of the bevel gear box 51, that is, in parallel to the right side plate of the rear frame 1 to which the bevel gear box 51 is attached. A bevel gear 54 is fixed onto the rear end of the output shaft 55 in the bevel gear box 51 and engages with the bevel gear 53, thereby constructing the leading part L of the power take-off train.

Figure 2:
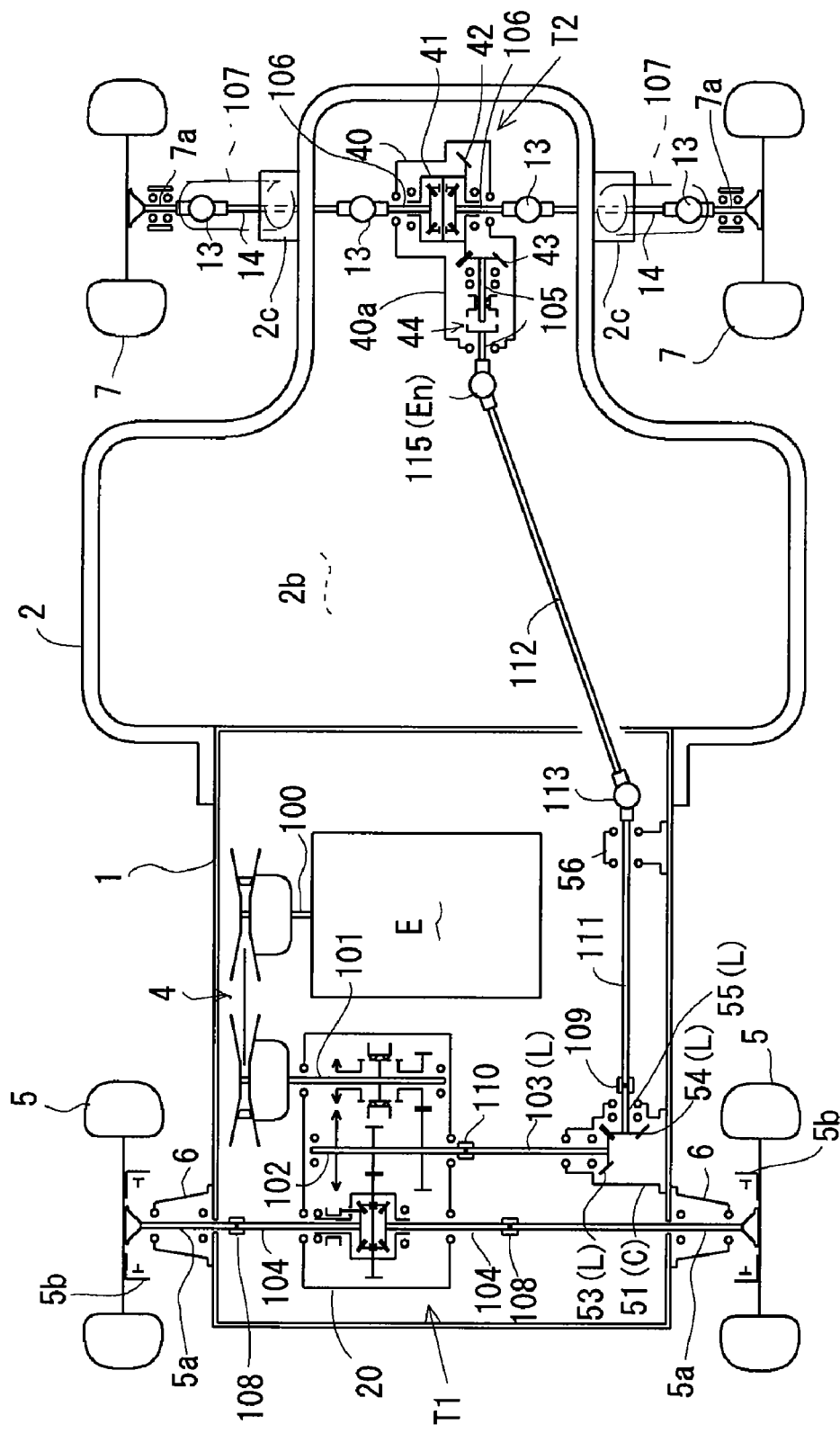
FIG. 2 is a schematic plan view of the cart or utility vehicle of FIG. 1.

As shown in FIG. 2, the output shaft 55 is extended in the fore-and-aft direction of the vehicle when viewed in plan, that is, extended perpendicularly to the input shaft 103. However, the output shaft 55 is slanted forwardly downward when viewed in side as shown in FIG. 1. A first propeller shaft 111 for driving the front wheel is coaxially extended forwardly downward from the front end of the output shaft 55 (in the fore-and-aft direction when viewed in plan). The output shaft 55 is spline-fitted to the propeller shaft 111 through a sleeve coupling 109 so as to be drivingly connected to the propeller shaft 111, similar to the coupling 108 drivingly connecting the axle 104 to the rear wheel axle 5a.

A pillow block 56 rotatably supports the front end of the propeller shaft 111. The pillow block 56 is attached onto the inside surface of the right side plate of the rear frame 1, preferably through a vibration proof rubber, similarly to the bevel gear box 51, and the front end of the propeller shaft 111 is further projected forwardly downward from the pillow block 56. A universal joint 113 is disposed just before the pillow block 56 so as to serve as the above-mentioned transmission direction changing part of this embodiment. The universal joint 113 connects the front end of the propeller shaft 111 to a rear end of a second propeller shaft 112 which is extended to the input part of the front transaxle T2 so as to drive the front wheels 7.

The outer end of the PTO shaft 102 projecting from the rear transaxle T1 is disposed adjacent to the right side of the housing 20 at the substantial lateral center of the vehicle, and the engine E exists before the PTO shaft 102. However, since the bevel gear box 51 is attached to the right side plate of the rear frame 1 as mentioned above, the output shaft 55 and the propeller shaft 111 extended from the bevel gear box 51 forward toward the universal joint 113 are extended in the fore-and-aft direction, when viewed in plan, and offset rightward from the engine E.

The front transaxle T2 has a housing 40 in which the differential gear mechanism 41 is provided. A rear end of the housing 40 projects rearward so as to serve as an input shaft support part 40a. The fore-and-aft input shaft 105 is pivotally supported in the input shaft support part 40a, and the rear end of the input shaft 105 is projected rearward from the rear end of the housing 40 and drivingly connected to the front end of the second propeller shaft 112 through an universal joint 115 serving as the ending part En of the power take-off train. The clutch 44 for switching two-wheel/four-wheel driving is interposed at the middle of the input shaft 105. A bevel gear 43 is fixed onto a front end of the input shaft 105, and a bevel bull gear 42 of the differential gear mechanism 41 engages with the bevel gear 43.

The second propeller shaft 112 is extended in the front frame 2, just below the platform 2b. Since the heights of the universal joints 113 and 115 are substantially the same, the propeller shaft 112 is extended substantially horizontally, thereby keeping the platform 2b low and horizontal.

When viewed in plan, the second propeller shaft 112 is laterally slanted between the universal joint 113 and the input shaft 105 of the front transaxle T2 disposed at substantial lateral center of the vehicle. However, the input shaft support part 40a is formed eccentrically rightward on the housing 40, so that the input shaft 105 is offset rightward from the lateral center of the vehicle so as to laterally approach the propeller shaft 111, thereby reducing a slant degree of the propeller shaft 112 against the input shaft 105 and improving the mechanical power transmission efficiency.

Next, explanation will be given of the second embodiment of the power transmission device shown in FIGS. 4 and 5. Explanation of parts designated by the same reference numerals as those of the first embodiment is omitted because they have the same functions.

In the power take-off train of this embodiment, propeller shafts 121 and 122 are coaxially linearly extended leftward slantwise from the leading part L disposed near the right end of the rear portion of the vehicle to the front transaxle T2 disposed at the substantial lateral center of the vehicle (the front transaxle T2 has the same construction and arrangement as the first embodiment). Namely, this power take-off train does not have the transmission direction changing part, equivalent to the universal joint 113, disposed at substantially the same height as the ending part En(the universal joint 115) to the front transaxle T2. The part of the power take-off train to be disposed below the platform 2b is also slant. The platform 2b is formed to have a slant part so as to pass the slant part of the power take-off train there below, thereby reducing an operation portion above the platform 2b. Also, the lateral width of a space for passing the power take-off train on the right side of the engine E must be expanded, thereby preventing lateral minimization of the vehicle. However, the coaxially linear propeller shafts 121 and 122 has a high mechanical power transmission efficiency from the leading part L to the ending part En.

Instead of the bevel gear box 51, a bevel gear box 61 is attached to the inner surface of the right side plate of the rear frame 1, preferably through a vibration proof rubber, so as to serve as the cabinet C incorporating the leading part L of the power take-off train in this embodiment. Similar to the first embodiment, the input shaft 103 extended laterally and drivingly connected to the PTO shaft 102 is inserted into the bevel gear box 61 through the left end of the bevel gear box 61, and a bevel gear 62 is fixed onto the right end of the input shaft 103 in the bevel gear box 61. However, the bevel gear box 61 is provided therein with a front end bearing part slanting leftwardly downward so as to pivotally support and project the first propeller shaft 121 serving as an output shaft of the leading part L. A bevel gear 63 is fixed onto the rear end of the first propeller shaft 121 in the bevel gear box 61 so as to engage with the bevel gear 62. The above-mentioned bevel gear box 51 is suitable for the bevel gear engagement between the input shaft 103 and the output shaft 55 (the first propeller shaft 111), which are disposed rectangular to each other when viewed in plan. On the other hand, the bevel gear box 61 of this embodiment is suitable for the bevel gear engagement between the input shaft 103 and the output shaft (first propeller shaft) 121, which have an angle slightly smaller than the right angle therebetween, that is, which are disposed acutely from each other, when viewed in plan.

Similar to the first embodiment, the universal joint 115 serves as the ending part En drivingly connected to the input shaft 105 of the front transaxle T2. As shown in FIGS. 4 and 5, the second propeller shaft 122 connected to the universal joint 115 is disposed coaxially to the first propeller shaft 121 extended from the bevel gear box 61. A sleeve coupling 109, which is similar to the above mentioned sleeve coupling 109 connecting the output shaft 55 to the first propeller shaft 111, is spline-fitted on the shafts 121 and 122 so as to integrally rotatably connect the shafts 121 and 122 to each other. Alternatively, the single propeller shaft 121 may be extended from the bevel gear box 61 to the universal joint 115.

Preferably, a pillow block 64 is provided upright on the bottom surface of the rear frame 1 near the connection part of the shafts 121 and 122, so as to support the first propeller shaft 121 (or the second propeller shaft 122).

The front transaxle T2 uses the same housing 40 as that of the first embodiment, which has the input shaft support part 40a offset rightward from the lateral center of the vehicle so as to reduce the lateral slant angle of the transmission shafts 121 and 122, thereby reducing the lateral width of the space for passing the first propeller shaft 121 on the right side of the engine E.

Figure 6:
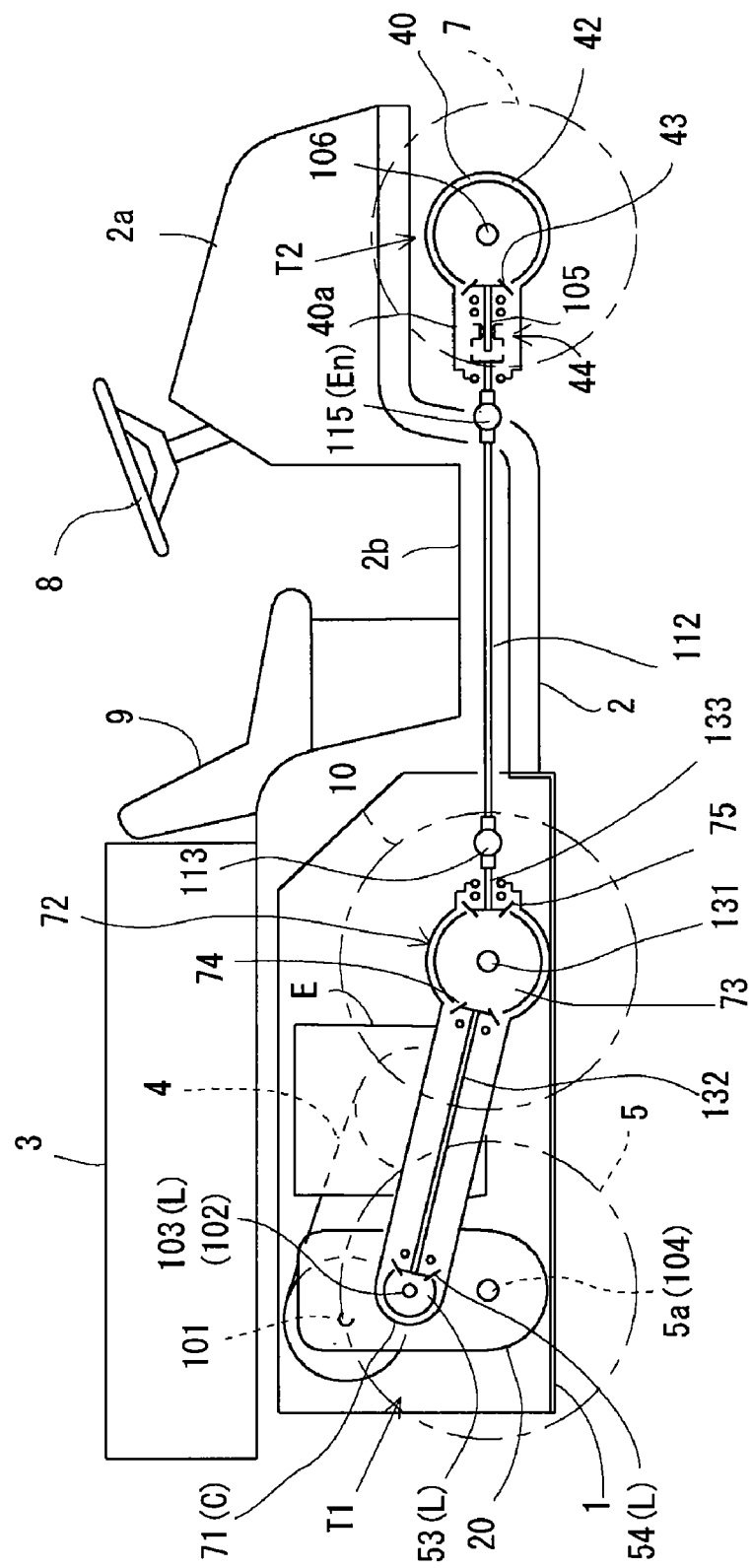
FIG. 6 is a schematic side view of a cart or utility vehicle having a power transmission system according to a third embodiment of the present invention.
Figure 7:
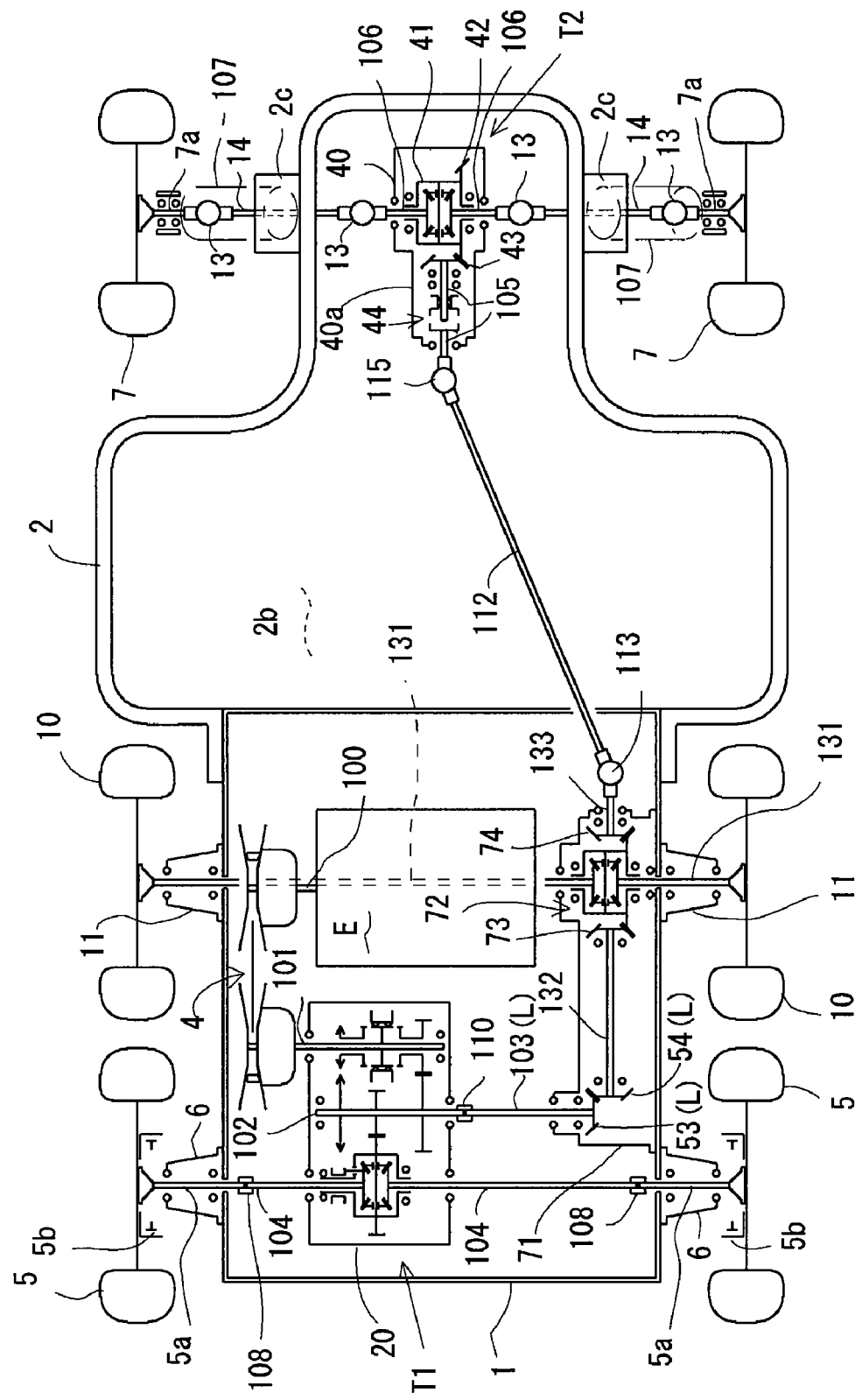
FIG. 7 is a schematic plan view of the cart or utility vehicle of FIG. 6.

Next, explanation will be given of the third embodiment of the power take-off train shown in FIGS. 6 and 7. The cart or utility vehicle of this embodiment has six wheels, and the middle wheels 10 are disposed at the left and right outsides of the rear frame 1, before the rear wheels 5. The bevel type power take-off train of the first embodiment is changed to transmit power from an intermediate portion thereof to third axles 131 serving as center shafts of the middle wheels 10. Similar to the axle support member 6, an axle support member 11 is fixed onto each of the left and right outside surfaces of the rear frame 1 so as to pivotally support each axle 131.

The power take-off train of this embodiment includes a transmission housing 71 attached to the inside surface of the right side plate of the rear frame 1, preferably through a vibration proof rubber. A propeller shaft 132, slanted forwardly downward when viewed in plan, is housed in the transmission housing 71. The input shaft 103 is inserted into a rear portion of the transmission housing 71 through a left end of the transmission housing 71, and a bevel gear 53 is fixed onto the shaft 103 in the transmission housing 71.

A bevel gear 54 is fixed onto the rear end of the shaft 132 in the transmission housing 71, and engages with the bevel gear 53. The front portion of the transmission housing 71 houses a differential gear mechanism 72 differentially connecting the axles 131 to each other, preferably before the engine E.

In consideration of the differential gear mechanism 72 disposed near the right end of the vehicle, the left axle 131 may be a single shaft, which is longer than the right axle 131 and extended to the left middle wheel 10. Alternatively, the left axle 131 may be divided at the middle thereof into divisional parts, which are connected by spline-fitting through a coupling, similar to the sleeve coupling 108. The same may be said of the later-discussed fifth embodiment.

A bull gear 73 of the differential gear mechanism 72 is a bevel gear, which engages with a bevel gear 74 fixed onto the front end of the propeller shaft 132. The bevel bull gear 73 engages at a front end thereof with a bevel gear 75 fixed onto a rear end of a propeller shaft 133. The propeller shaft 133 is extended in the fore-and-aft direction when viewed in plan, forward from the transmission housing 71, and is connected to the universal joint 113. The universal joint 113 is disposed just before the transmission housing 71 so as to serve as the transmission direction changing part. The universal joint 113 is leveled with the axles 131 so as to substantially horizontally extend the propeller shaft 133.

Instead of the transmission housing 71, the same bevel gear box 51 as the first embodiment may be provided so as to incorporate the leading part L of the power take-off train, and a housing for housing the differential gear mechanism 72 is provided separately from the bevel gear box 51. However, in this embodiment, the integral transmission housing 71 incorporates the engagement part of the bevel gears 53 and 54 and the differential gear mechanism 72 together, which can be luxuriated by common lubricating oil filled in the transmission casing 71. Also, the transmission housing 71 can serve as a protective cover for the propeller shaft 132.

With regard to the front transaxle T2 of this embodiment, the housing 40 has the input shaft support part 40a for supporting the input shaft 105, which is not offset laterally from the differential gear mechanism 72 and extended rearward from just behind the differential gear mechanism 72. Alternatively, the front transaxle T2 may use the housing 40 of the first (or second) embodiment, having the input shaft support part 40a for supporting the input shaft 105, which is offset laterally from the differential gear mechanism 72.

Figure 8:
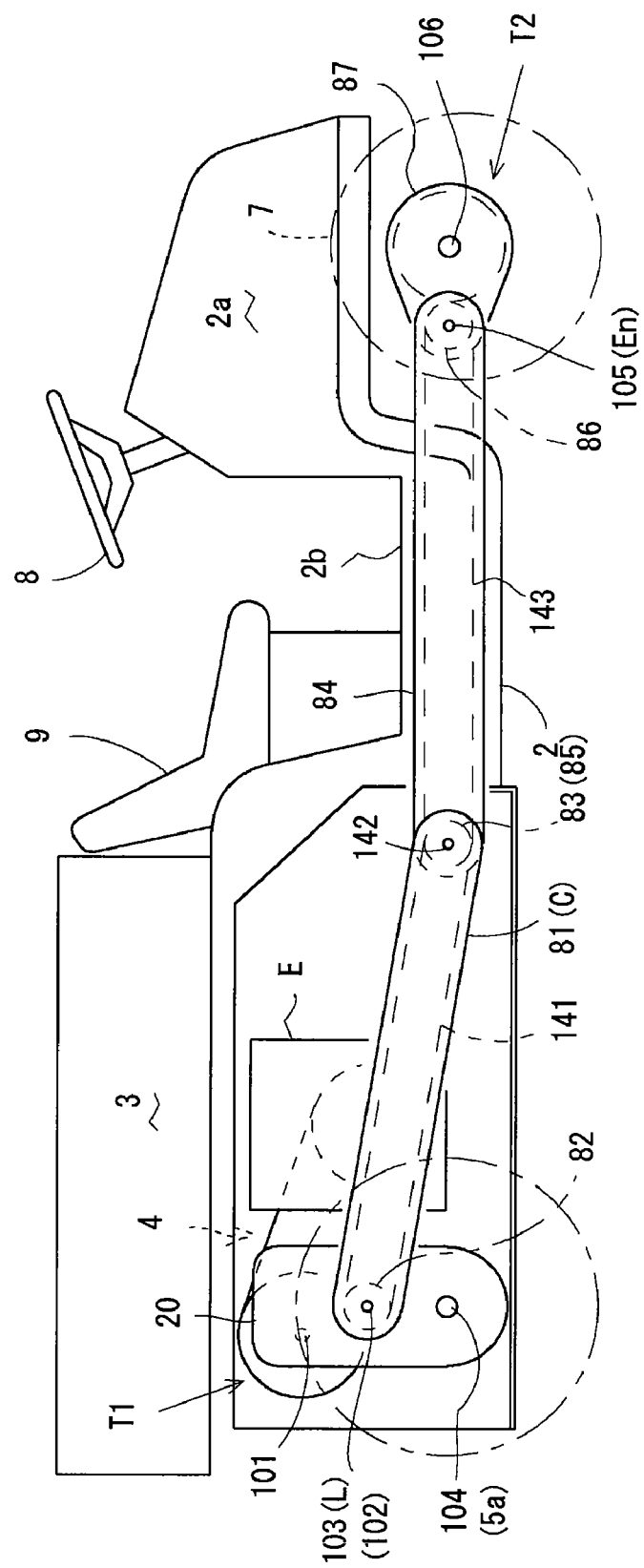
FIG. 8 is a schematic side view of a cart or utility vehicle having a power transmission system according to a fourth embodiment of the present invention.

Next, explanation will be given on the fourth embodiment of the power take-off train shown in FIGS. 8 and 9. The power take-off train of this embodiment has a first chain casing 81 serving as the cabinet C incorporating the leading part L thereof, which is disposed in the fore-and-aft direction along the inner surface of the right side plate of the rear frame 1 when viewed in plan and slanted forwardly downward when viewed in side. The input shaft 103 extended coaxially from the PTO shaft 102 of the rear transaxle T1 is inserted into the chain casing 81 through the rear end of the chain casing 81, so as to be fixedly provided thereon with a leading sprocket 82. As the transmission direction changing part, a substantially laterally extended intermediate sprocket shaft 142 is pivotally supported in the rear frame 1 before the engine E, inserted into the front end of the first chain casing 81, and fixedly provided thereon with a second sprocket 83. In the first chain casing 81, a chain 141 is extended in the fore-and-aft direction when viewed in plan and slanted forward downward when viewed in side, so as to be interposed between the sprockets 82 and 83.

A second chain casing 84 is disposed so as to have a rear end on the left side of the front end of the first chain casing 81. The second chain casing 84 is extended in the fore-and-aft direction when viewed in plan and horizontally forward below the platform 2b, and the front end of the second chain casing 84 is fixed to an inside surface of a rear right side plate portion of a housing 87 of the front transaxle T2 of this embodiment. The intermediate sprocket shaft 142 is inserted into the second chain casing 84 and fixedly provided thereon with a third sprocket 85. In the front transaxle T2 of this embodiment, the input shaft 105 is a sprocket shaft extended substantially laterally, inserted into the second chain casing 84 through the front end of the casing 84 at the same height as the intermediate sprocket shaft 142, and fixedly provided thereon with an ending bevel gear 86 serving as the ending part En. In the second chain casing 84, a chain 143 is extended horizontally in the fore-and-aft direction so as to be interposed between the sprockets 85 and 86.

In this chain type power take-off train, the input shaft 103 serves as the leading part L, the sprocket shaft 142 as the transmission direction changing part, and the input shaft 105 as the ending part En. The chain 141, serving as a first part of the power take-off train between the input shaft 103 and the sprocket shaft 142, is extended in parallel to the chain 143, serving as a second part of the power take-off train between the sprocket shaft 142 and the input shaft 105, when viewed in plan. The first chain casing 81 housing the chain 141 is offset rightward from the engine E so as to be prevented from interfering with the engine E. The second chain casing 84 housing the chain 143 is disposed below the platform 2b, and the rear end of the second chain casing 84 is disposed before the engine E so as to be prevented from interfering with the engine E.

The chain casings 81 and 84 are suitably attached to the vehicle body, such as the rear frame 1 or the front frame 2, preferably through vibration proof rubbers.

In addition, in a housing 87 of the front transaxle T2, a clutch gear 89 is freely rotatably fitted on the laterally extended input shaft 105, and engages with a bull gear 90 of the differential gear mechanism 41. The clutch gear 89 and the bull gear 90 are spur gears. The clutch 88 for switching two-wheel/four-wheel driving mode is interposed between the input shaft 105 and the clutch gear 89.

Figure 9:
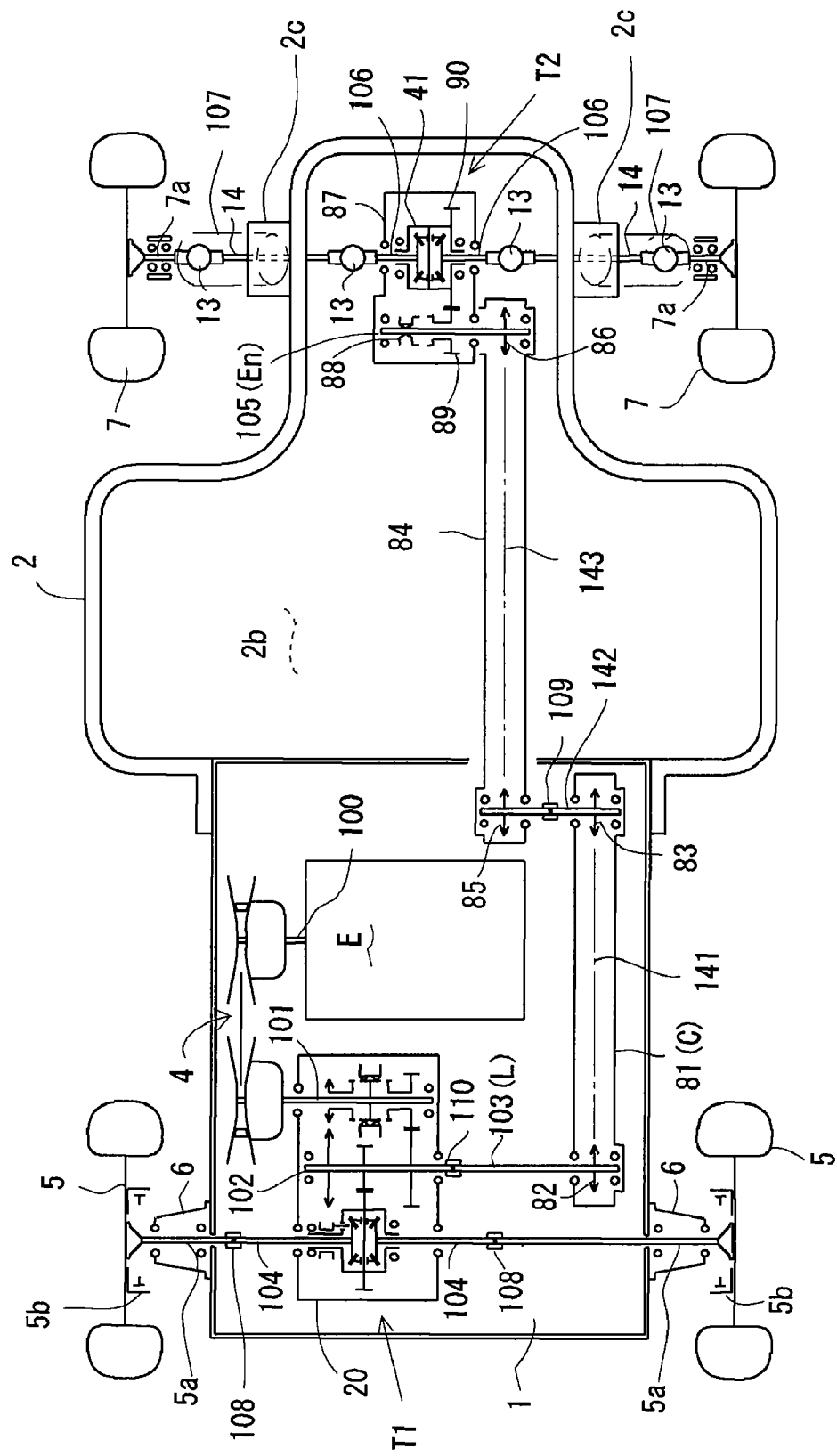
FIG. 9 is a schematic plan view of the cart or utility vehicle of FIG. 8.

As shown in FIG. 9, the intermediate sprocket shaft 142 is divided between the chain casings 81 and 84, and divisional parts of the intermediate sprocket shaft 142 are connected to each other by spline-fitting through a coupling 109, similar to the above-mentioned coupling 109. Alternatively, the intermediate sprocket shaft 142 may be a single shaft. The same may be said of the later-discussed fifth embodiment.

Figure 10:
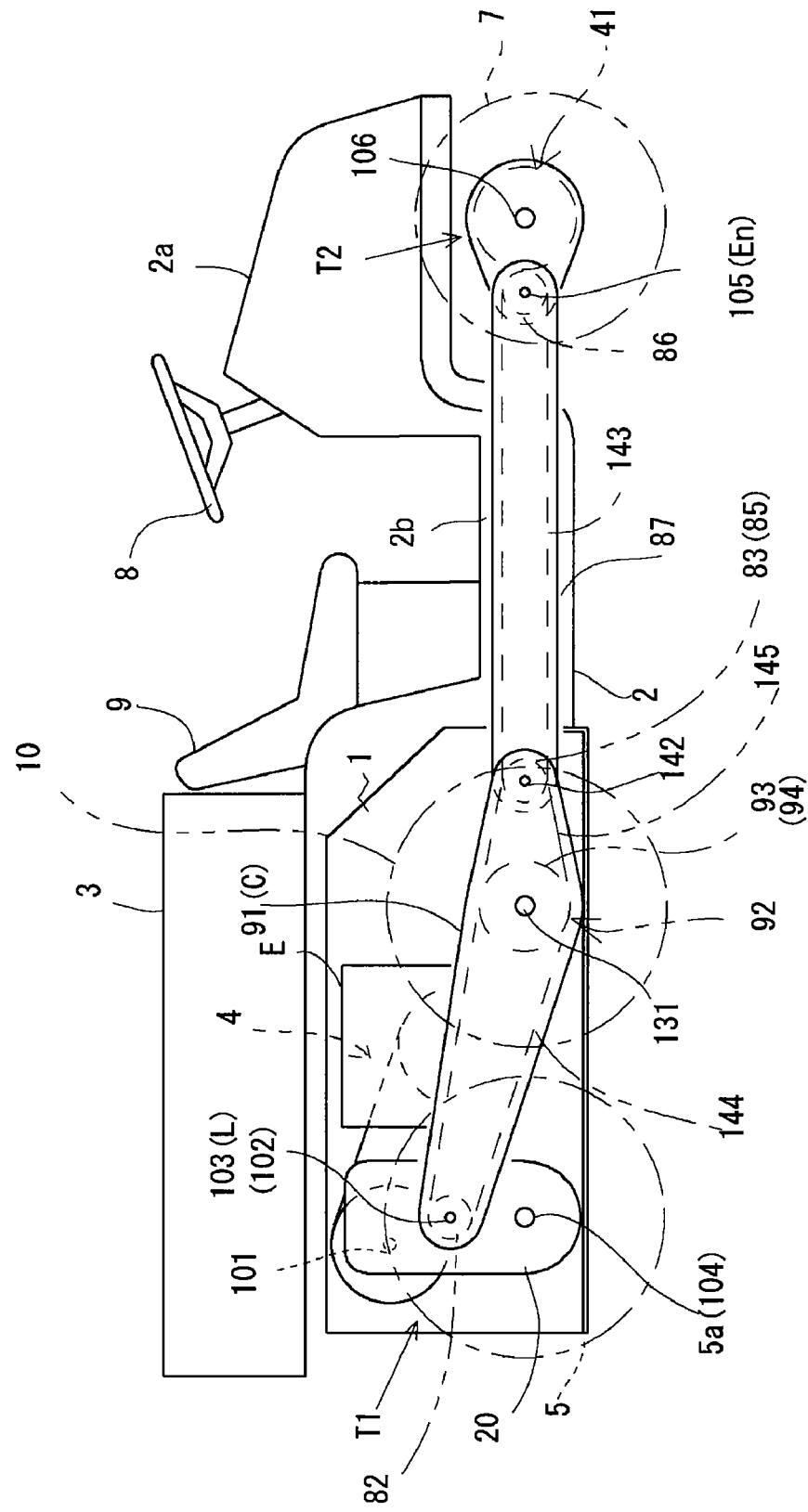
FIG. 10 is a schematic side view of a cart or utility vehicle having a power transmission system according to a fifth embodiment of the present invention.
Figure 11:
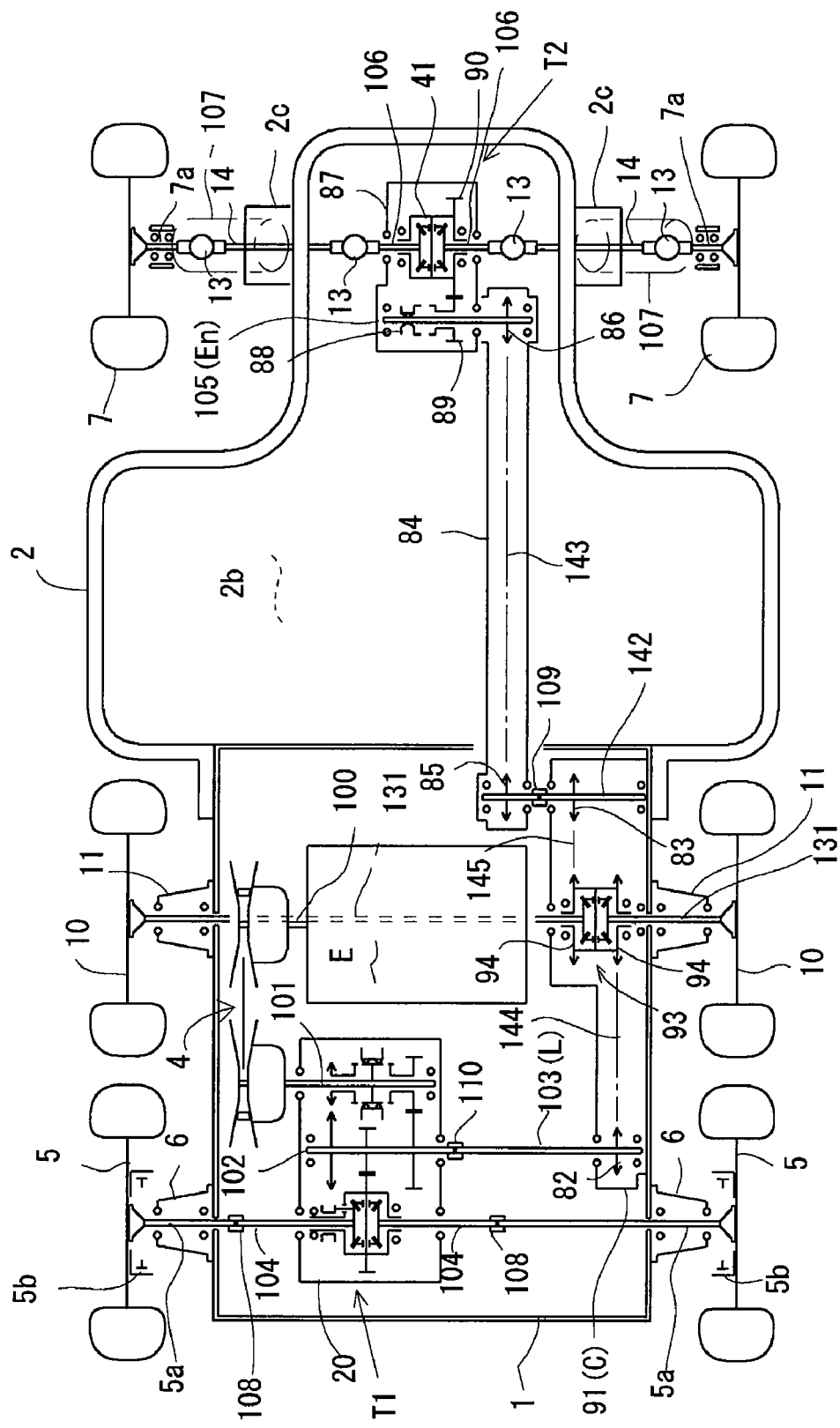
FIG. 11 is a schematic plan view of the cart or utility vehicle of FIG. 10.

Next, explanation will be given of the fifth embodiment of the power take-off train shown in FIGS. 10 and 11. The cart or utility vehicle of this embodiment has six wheels, similarly to the third embodiment, and the middle wheels 10 are disposed on the left and right outsides of the rear frame 1, before the rear wheels 5. The chain type power take-off train of this embodiment is modification of the chain type power take-off train of the fourth embodiment, which transmits power from an intermediate portion thereof to the third axles 131 serving as center shafts of the middle wheels 10. Similarly to the axle support members 6, the axle support members 11 are fixed onto the left and right outside surfaces of the rear frame 11 so as to pivotally support the respective axles 131.

In this embodiment, a first chain casing 91 serving as the cabinet C incorporating the leading part L of the power take-off train is attached to the inner surface of the right side plate of the rear frame 1, preferably through a vibration proof rubber. The PTO input shaft 103 is inserted forward into the chain casing 91, and fixedly provided thereon with a leading sprocket 82 in the chain casing 91. The intermediate sprocket shaft 142 is inserted rearward into the chain casing 91, and fixedly provided thereon with the sprocket 83 in the chain casing 91. Similar to the fourth embodiment, the second chain casing 84 is extended substantially horizontally in the fore-and-aft direction from a left side of the front end of the first chain casing 91 to a right aide of the rear portion of the housing 87 of the front transaxle T2. The interior construction of the second chain casing 84 and the construction of the front transaxle T2 in the housing 87 are the same as those of the fourth embodiment.

In the first chain casing 91, a differential gear mechanism 93 is disposed just behind the sprocket shaft 142, so as to differentially connect the axles 131 to each other. An input sprocket 94 of the differential gear mechanism 93 is freely rotatably fitted on one of the axles (right axle) 131, and an output sprocket 95 is freely rotatably fitted on the other (left) axle 131. A chain 144 is interposed between the sprockets 82 and 94, and a chain 145 is interposed between the sprockets 95 and 83. The chains 144 and 145 are extended in parallel and in the fore-and-aft direction when viewed in plan. The height of the axles 131 is the same as the sprocket shaft 142. As a result, the chain 145 interposed between the shafts 131 and 142 is substantially horizontal, and the chain 144 interposed between the axle 131 and the input shaft 103 higher than the axle 131 is slanted forwardly downward.

Incidentally, in both the fourth embodiment and the fifth embodiment, the sprockets 82, 83, 85 and 86 have the same diameters. However, the sprockets 94 and 95 of the differential gear mechanism 93 in the fifth embodiment are larger than the sprockets 82, 83, 85 and 86, whereby the deceleration ratio between the PTO input shaft 103 (the intermediate transmission shaft 102) and the axle 131 corresponds to the deceleration ratio between the intermediate transmission shaft 102 and the axle 104 in the rear transaxle T1, and the deceleration ratio between the input shaft 105 and the axle 106 in the front transaxle T2.

Various embodiments of the power take-off train from the rear transaxle T1 to the front transaxle T2 have been mentioned above. Next, explanation will be given of a modificative embodiment of the driving connection between the PTO shaft 102 of the rear transaxle T1 and the leading part L of the power take-off train, and a modificative embodiment of the cabinet C incorporating the leading part L of the power take-off train, with accordance to FIGS. 12 to 17. These embodiments are shown as modificative embodiments of the bevel gear box 51 incorporating the bevel gears 53 and 54 engaging with each other, which are disposed perpendicular to each other when viewed in plan shown in FIG. 2. However, these embodiments are also applicable to each leading part L of the power take-off train of the second to fifth embodiments. The same members shown in FIGS. 1 to 3 are designated by the same numerals.

Figure 12:
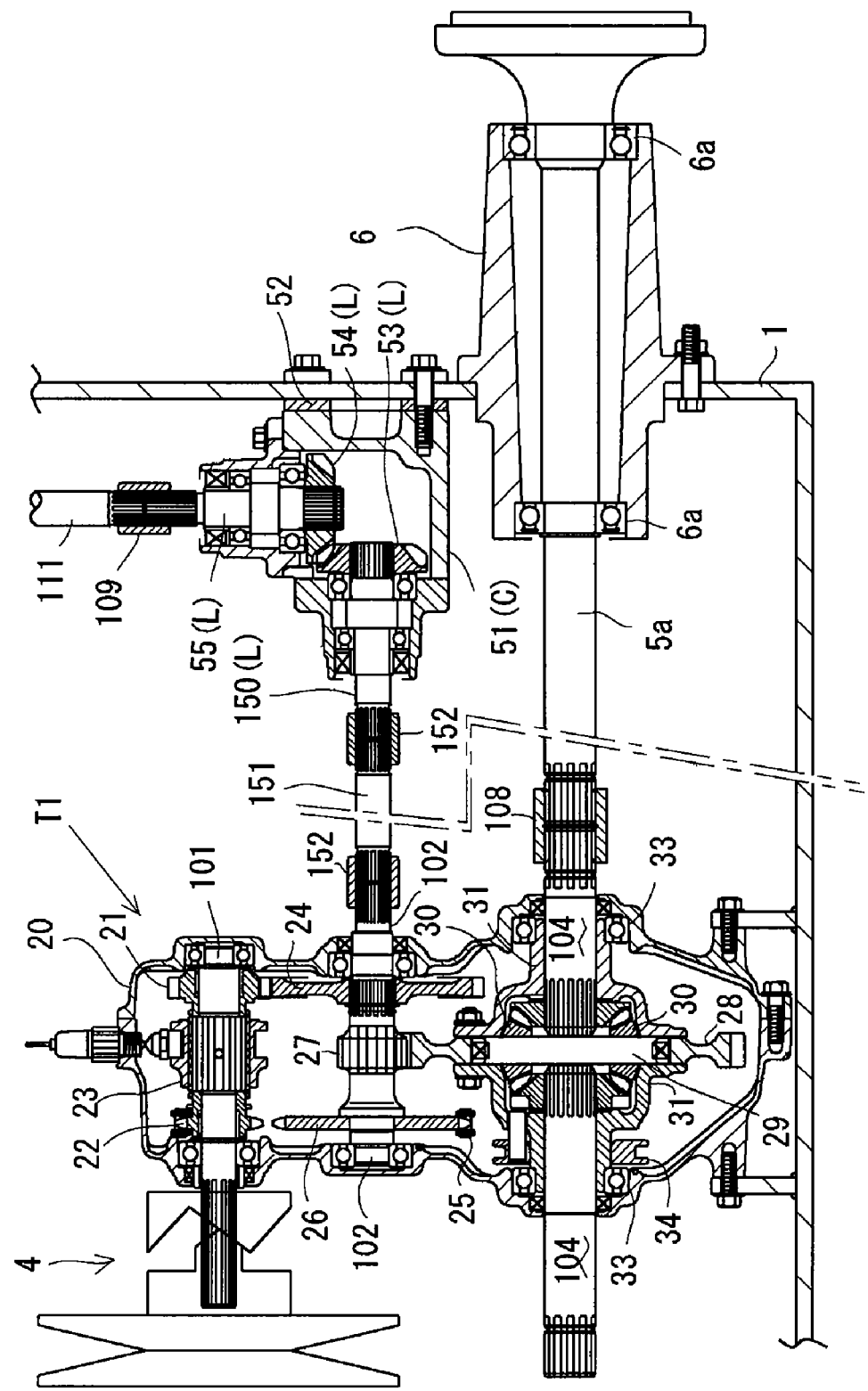
FIG. 12 includes a sectional rear view of the rear transaxle T1 and the rear axle bearing support member, and a sectional plan view of the leading part of the power take-off train according to the first embodiment, wherein the rear transaxle T1 is drivingly connected to the leading part of the power take-off train through a pair of sleeve couplings.

The bevel gear box 51 shown in FIG. 12 pivotally supports a laterally extended input shaft 150 at the left end portion thereof. In the bevel gear box 51, the input shaft 150 engages with the output shaft 55 through the bevel gears 53 and 54. The input shaft 150 is disposed coaxially to the PTO shaft 102. A transmission shaft 151 is coaxially interposed between the shafts 150 and 102, with both ends of shaft 151 connected to the shafts 150 and 102 through splines in sleeve couplings 152, similar to the above mentioned coupling 109.

A backlash of the spline notched in each of the couplings 152 may be made so large as to permit an axial deviation of the shafts 150 and 151, or of the shafts 102 and 151, whereby the above-mentioned expensive flexible coupling 110 becomes unnecessary. The vibration proof rubber 52 is used for reducing transmission of vibration from the bevel gear box 51 to the rear frame 1.

Figure 13:
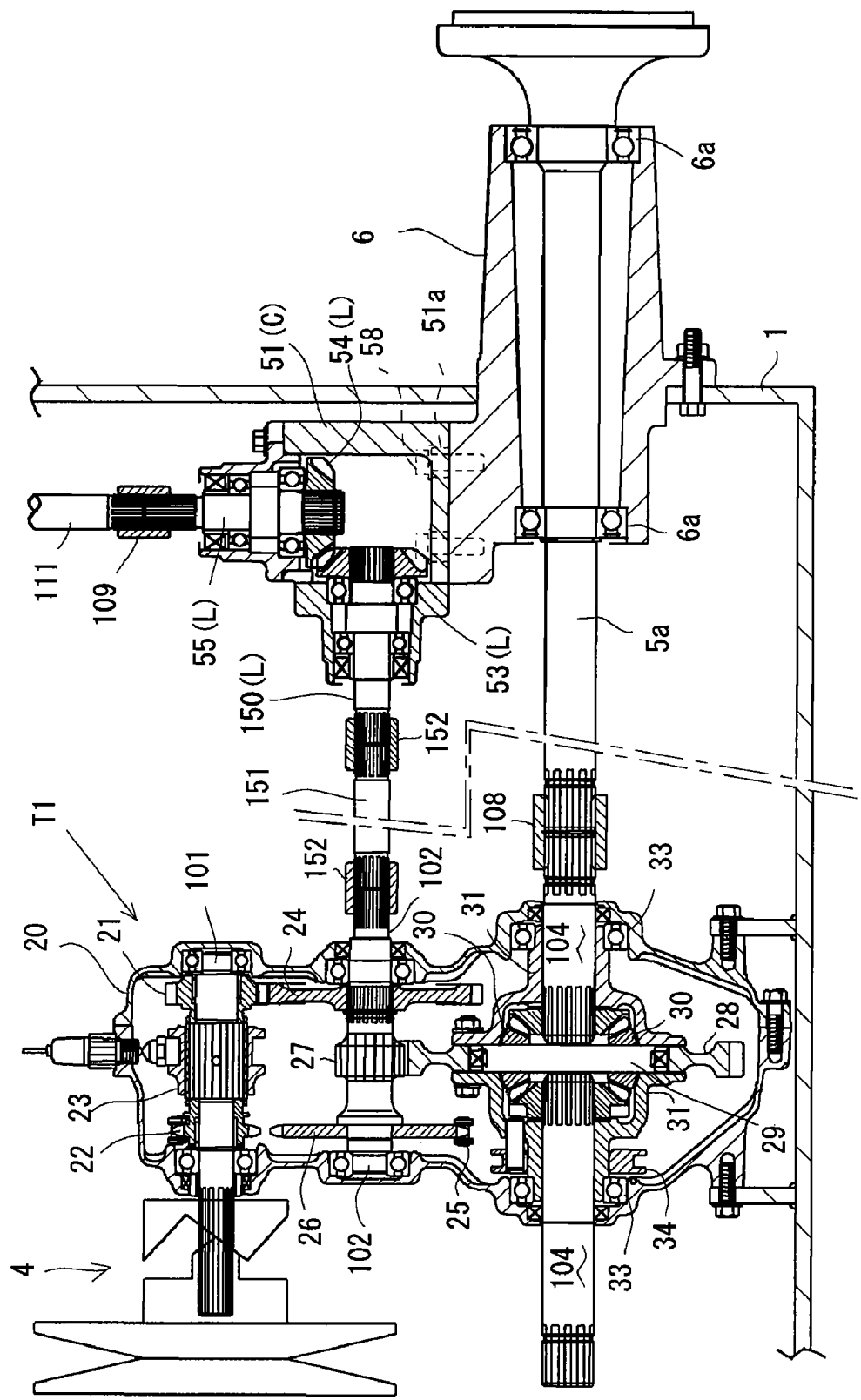
FIG. 13 includes a sectional rear view of the rear transaxle T1 and the rear axle bearing support member, and a sectional plan view of the leading part of the power take-off train according to an embodiment modified from the embodiment of FIG. 12, wherein a casing incorporating the leading part of the power take-off train is connected to the rear axle bearing support member.
Figure 14:
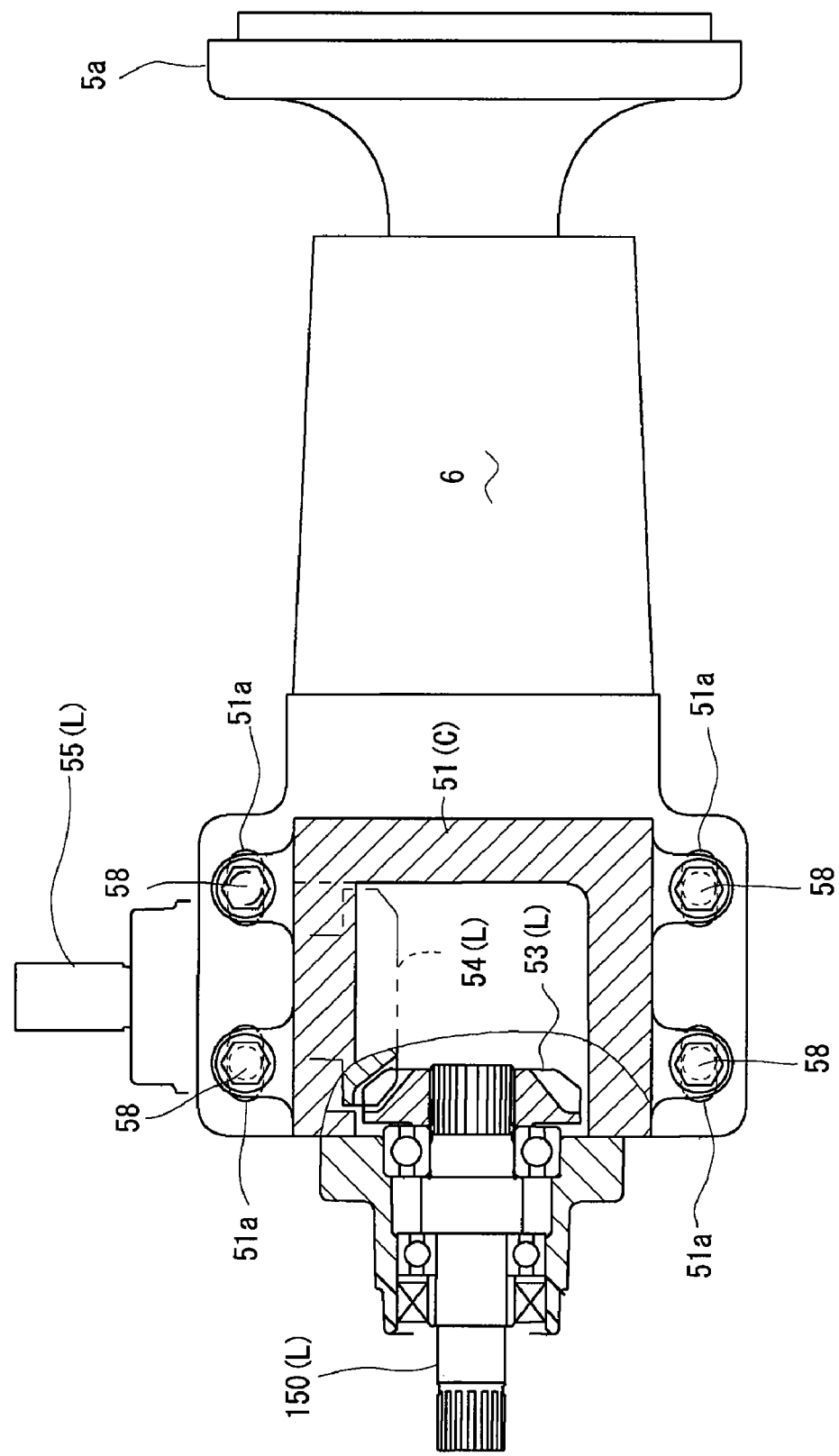
FIG. 14 is a top view of a bevel gear box and the rear axle bearing support member connected to each other shown in FIG. 13.

The bevel gear box 51 shown in FIG. 13 is equivalent to the bevel gear box 51 of FIG. 12 except that the bottom surface is screwed to the upper surface of the rear wheel axle support member 6 by bolts 58. The output shaft 55 is supported by the bevel gear box 51 so that the front end thereof is slanted downward, similar to that of the first embodiment. The rear wheel axle support member 6 is formed with upwardly open tapped holes for the bolts 58. As shown in FIG. 14, boss parts are formed on the bottom surface of the bevel gear box 51 and an oval hole 51a is formed through each of the boss parts so as to face to each of the tapped holes for passing each of the bolts 58 therethrough. The major axis of the oval hole 51a is extended laterally so as to ease the positioning of the bevel gear box 51 relative to the rear wheel axle support member 6. Accordingly, at the time of mounting the rear wheel axle support member 6 to the rear frame 1, the bevel gear box 51 is integrally mounted thereto at once, whereby it is not necessary to provide an attachment seat for the bevel gear box 51 on the rear frame 1. The assemble can be performed that the long propeller shaft 111 has been supported by the rear frame 1 previously and the output shaft 55 is connected to the shaft 111 lastly, and in this case, the axes of the propeller shaft 111 and the output shaft 55 can be made agree with each other easily.

Figure 15:
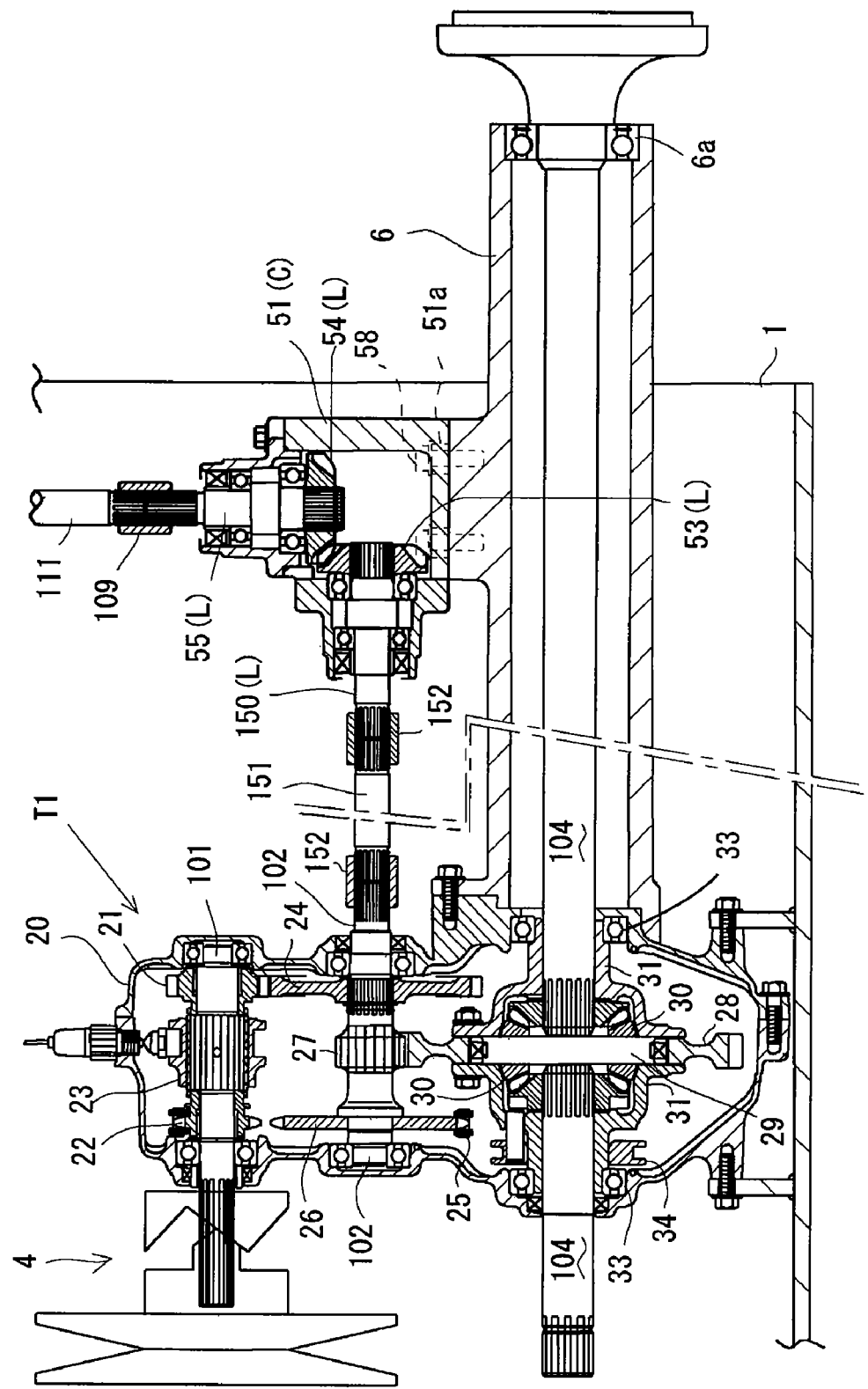
FIG. 15 includes a sectional rear view of the rear transaxle T1 and the rear axle bearing support member and a sectional plan view of the leading part of the power take-off train according to an embodiment modified from the embodiment of FIG. 13, wherein the rear axle bearing support member is extended and connected to the rear transaxle T1.

With regard to the rear wheel axle support member 6 shown in FIG. 15, the bevel gear box 51 is mounted thereon similarly to that of FIGS. 13 and 14, and the inner end portion of the support member 6 is extended so as not to be fixed to the rear frame 1 but to be fixed to the housing of the rear transaxle T1. Accordingly, the rear transaxle T1, the bevel gear box 51 and the rear wheel axle support member 6 connected with each other can be handled as one unit.

Figure 16:
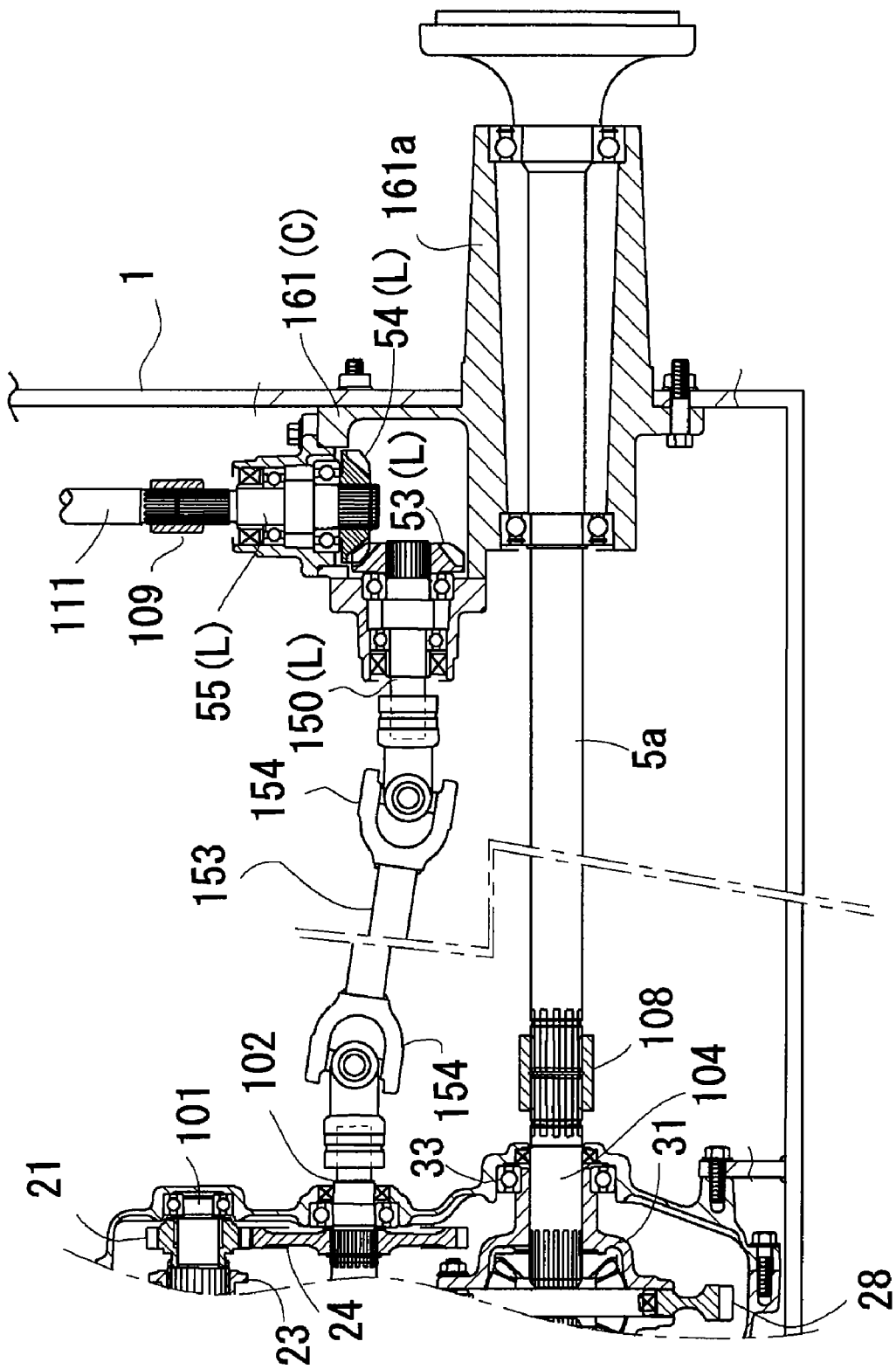
FIG. 16 includes a sectional rear view of the rear transaxle T1 and the rear axle bearing support member and a sectional plan view of the leading part of the power take-off train, wherein a part of the casing incorporating the leading part of the power take-off train is formed as the rear axle support member and the leading part is drivingly connected to the rear transaxle T1 through an universal joint.

A bevel gear box 161 of FIG. 16, serving as the cabinet C incorporating the leading part L of the power take-off train, is fixed to the right side plate of the rear frame 1 by bolts, and the bevel gear box 161 is integrally formed with an axle support part 161a pivotally supporting the rear wheel axle 5a. Accordingly, the separate rear wheel axle support member 6 is not used for supporting the rear wheel axle 5a, thereby reducing part number and cost. The axle support part 161a has an inner space open to the main inner space of the bevel gear box 161, so that common lubricating oil can be shared among the bearings of the rear wheel axle 5a in the axle support part 161 and the bevel gear mechanism including the bevel gears 53 and 54. Furthermore, due to the axle support part 161a integrally formed on the bevel gear box 161, the vertical dead space, which exists between the bevel gear box 51 and the right rear wheel axle support member 6 in the first embodiment, can be eliminated.

However, since the bevel gear box 161 is made close to the rear wheel axle 5a, the shift of the axis of the input shaft 150 from the axis of the PTO shaft 102 is considerably large. In this regard, on the left side of the bevel gear box 161, a transmission shaft 153 is disposed suitably slantwise between the PTO shaft 102 and the input shaft 150, and opposite ends of the transmission shaft 153 are connected to the PTO shaft 102 and the input shaft 150 through respective universal joints 154.

Figure 17:
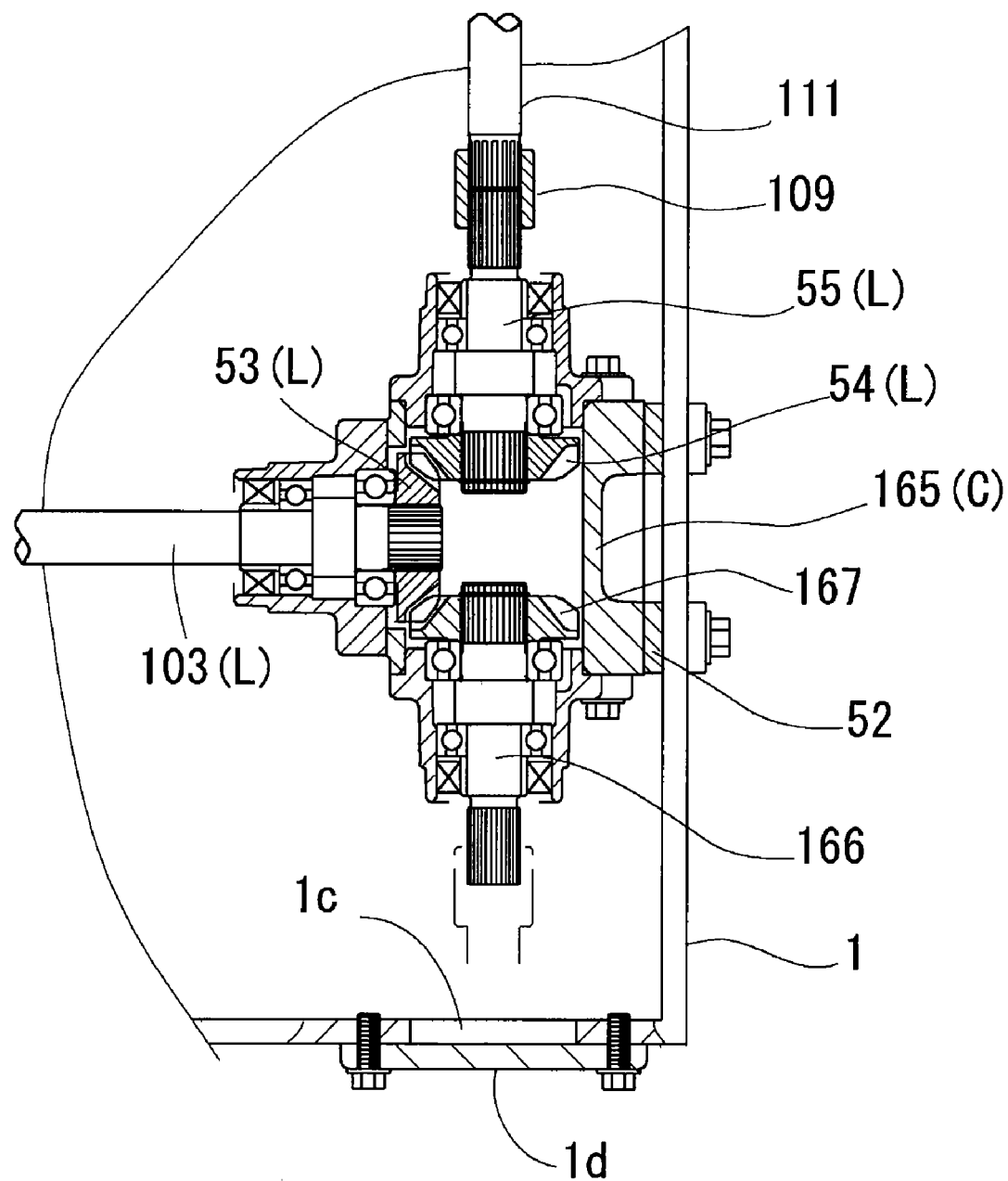
FIG. 17 is a sectional plan view of an embodiment of the leading part of the power take-off train, which is applicable to the power transmission system according to the first embodiment and has a second PTO shaft.

A bevel gear box 165 shown in FIG. 17 pivotally supports a second PTO shaft 166 at its rear end portion so that the second PTO shaft 166 is disposed opposite to the forwardly projecting output shaft 55. A bevel gear 167 is fixed onto the second PTO shaft 166, and engages with the bevel gear 53 on the input shaft 150. The second PTO shaft 166 projects rearward from the bevel gear box 165 so as to serve as a PTO shaft, which is optionally drivingly connected to a drive shaft of a ground-speed type working machine, such as a seeding machine, attached to each of the utility vehicles shown in FIGS. 1 to 11. An opening 1c is provided in the rear end surface of the rear frame 1 for drivingly connecting the drive shaft to the second PTO shaft 166. Unless the second PTO shaft 166 is used, the opening 1c is closed by a lid 1d.

Figure 18:
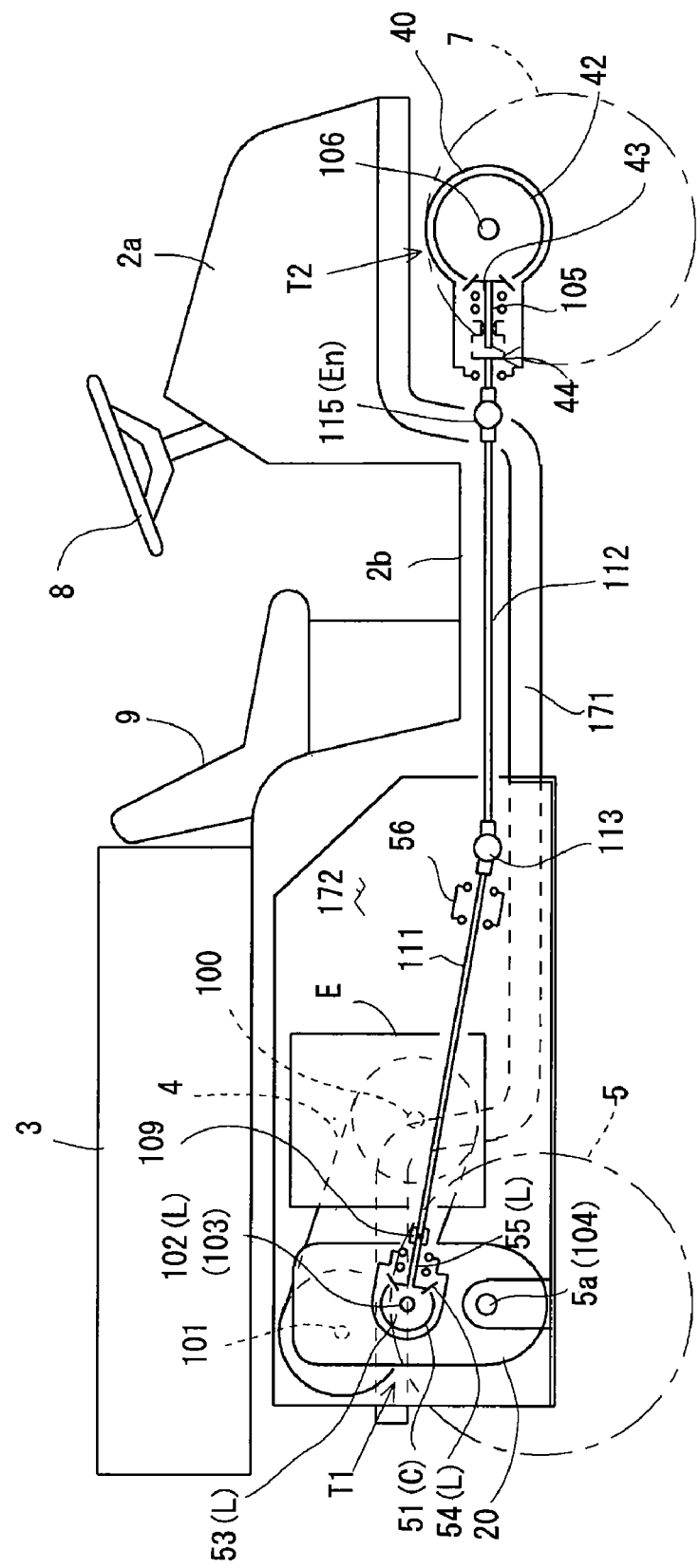
FIG. 18 is a schematic side view of a cart or utility vehicle, to which the power transmission system of the first embodiment and a first mode of a rear wheel suspension are applied.
Figure 19:
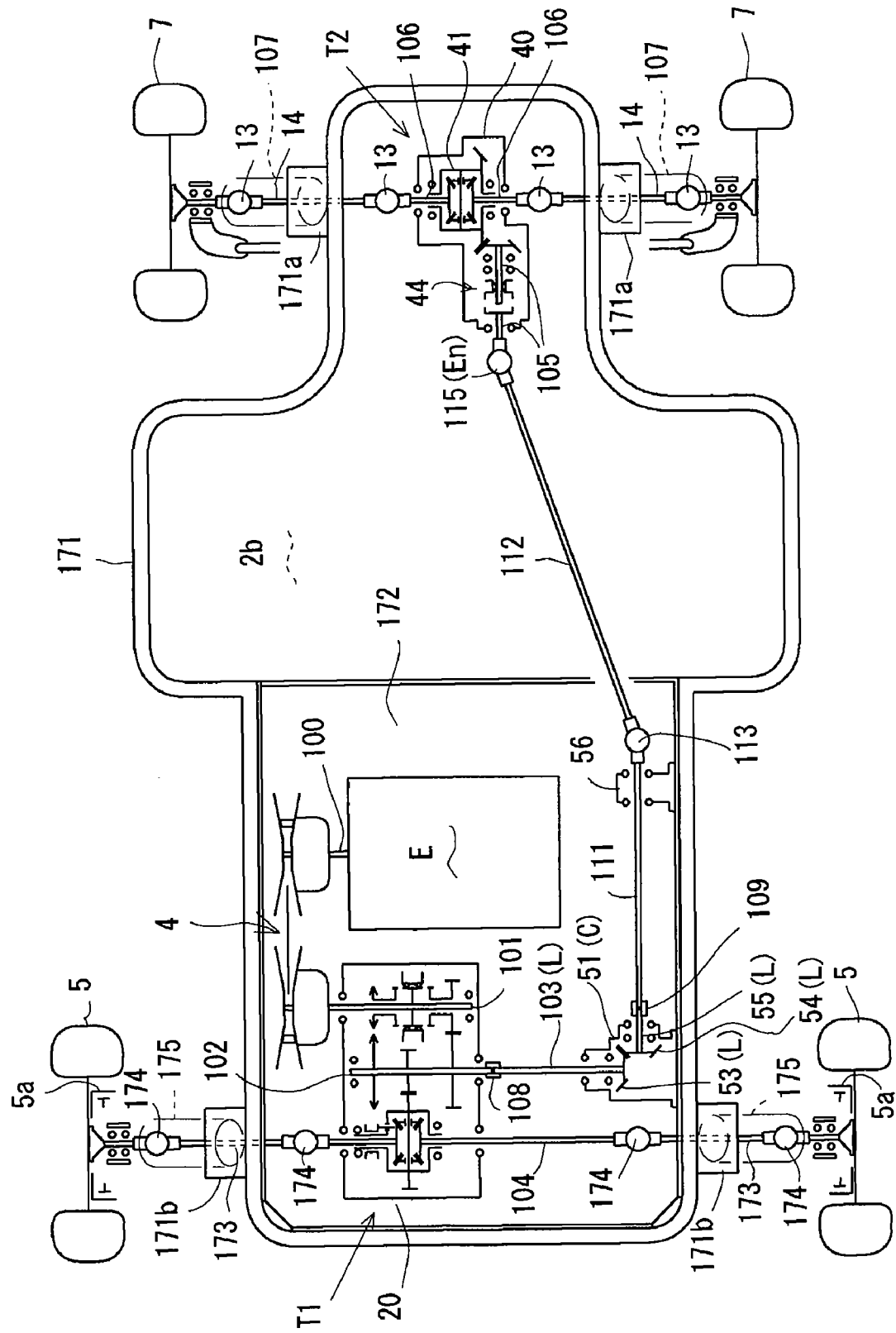
FIG. 19 is a schematic plan view of the cart or utility vehicle of FIG. 18.

Next, explanation will be given of the following two embodiments concerning to a rear wheel suspension of the cart, to which the power take-off train of any of the embodiments is applied, according to FIGS. 18 and 19. FIGS. 18 and 19 illustrate the power take-off train shown in FIGS. 1 to 3 for transmitting power from the rear transaxle T1 to the front transaxle T2. However, the following embodiments of the rear wheel suspension are also applicable to each leading part L of the power take-off trains of the second to fifth embodiments. Especially, with respect to the third or fifth embodiment of the power take-off train, the later-discussed rear wheel suspension structure can also be used for suspending the middle wheels 10. The same members or members having the same functions shown in FIGS. 1 to 11 are designated by the same numerals.

A frame 171 of the cart or utility vehicle having a cargo deck shown in FIGS. 18 and 19 is extended from the front end of the vehicle to the rear end thereof. The front half portion of the frame 171 corresponds to the front frame 2 of the cart or utility vehicle shown in FIGS. 1 to 11, and is provided thereon with the front cover 2a and platform 2b, similarly to the above-mentioned. The cargo deck 3 is supported on a base 172 corresponding to the rear frame 1. The base 172 comprises a horizontal bottom plate and vertical side plates provided upright from front, rear, left and right edges of the bottom plate. The engine E and the rear transaxle T1 are mounted on the bottom plate. The rear half portion of the frame 171 is extended so as to enclose the left, right and rear side plates of the base 172.

Similar to the front frame 2, the front end of the frame 171 is disposed higher for a degree than the portion of the frame 171 below the platform 2b, so as to have the front transaxle T2 there below. Stays 171a project laterally outward from the left and right front ends of the frame 171, respectively. Similarly, the rear end portion of the frame 171 is disposed higher for a degree than the longitudinal middle portion thereof, and stays 171b project laterally outward from the left and right rear ends of the frame 171, respectively.

Similar to the above-mentioned embodiments in FIGS. 1 to 11, the front transaxle T2 of this embodiment supports the left and right second axles 106 drivingly connected through the universal joints 13 and the vertically slanted transmission shaft 14 to the respective front wheel axles 7a of the front wheels 7, steerably disposed at the left and right outsides of the front portion of the frame 171. Suspension mechanisms 107, comprising coil springs or shock absorbers, are extended from the stays 171 a to the front wheel axles 7a so as to suspend the front wheels 7. Accordingly, the front portion of the vehicle body is supported vertically movably against the front wheels 7.

The rear wheel axles 5a of the rear wheels 5 are connected to the respective axles 104 of the rear transaxle T1 through respective vertically slanted transmission shafts 173 and universal joints 174, so that the rear portion of the vehicle body is supported vertically movably against the rear wheels 5. Furthermore, the suspension mechanisms 175, comprising coil springs or shock absorbers, are extended from the stays 171b to the rear wheel axles 5a so as to suspend the rear wheels 5. Accordingly, the vehicle is comfortable during traveling on a rough road. Further, due to the vertically movably suspended rear portion of the vehicle body relative to the rear wheels 5, the minimum ground clearance of the rear transaxle T1 is increased.

Figure 20:
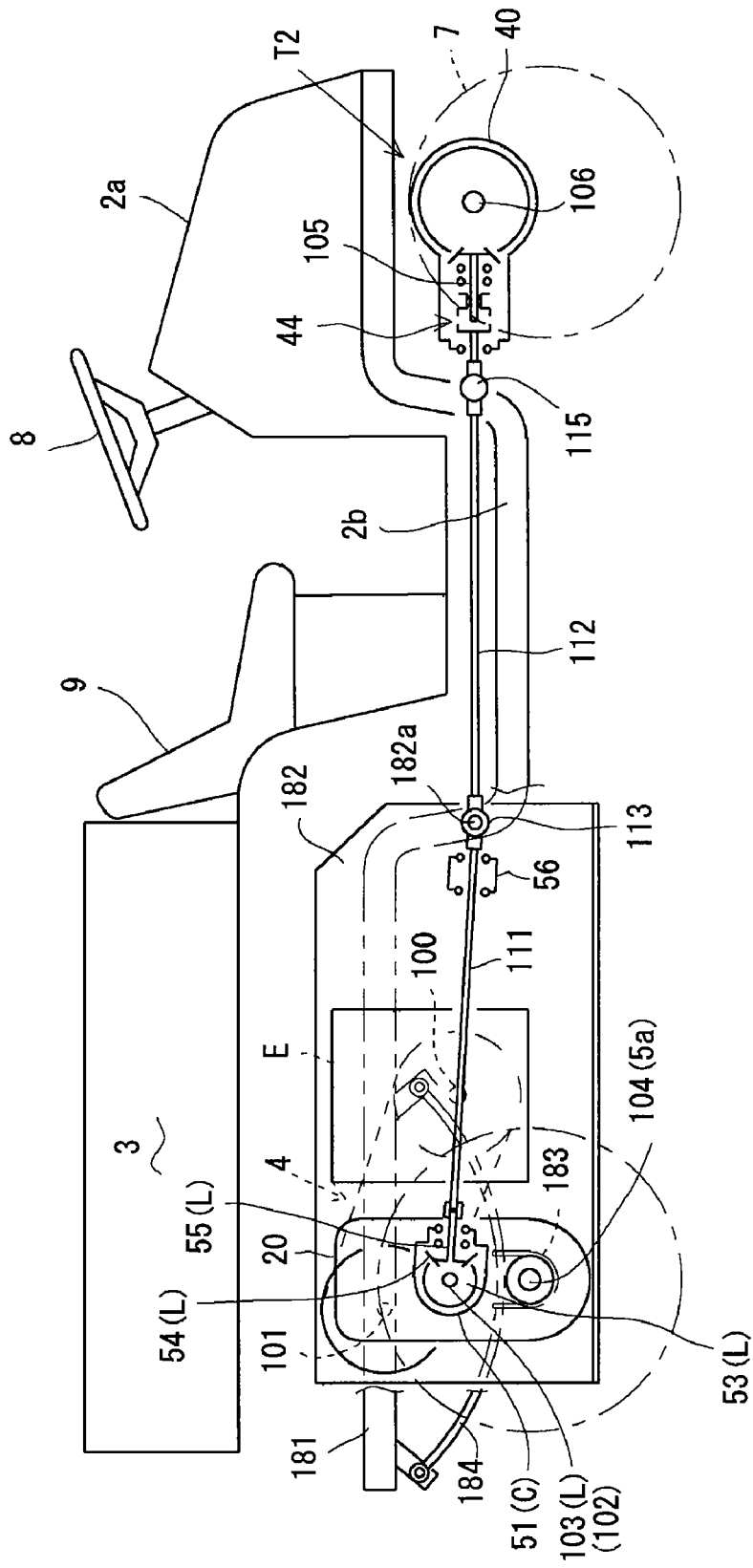
FIG. 20 is a schematic side view of a cart or utility vehicle, to which the power transmission system of the first embodiment and a second mode of the rear wheel suspension are applied.
Figure 21:
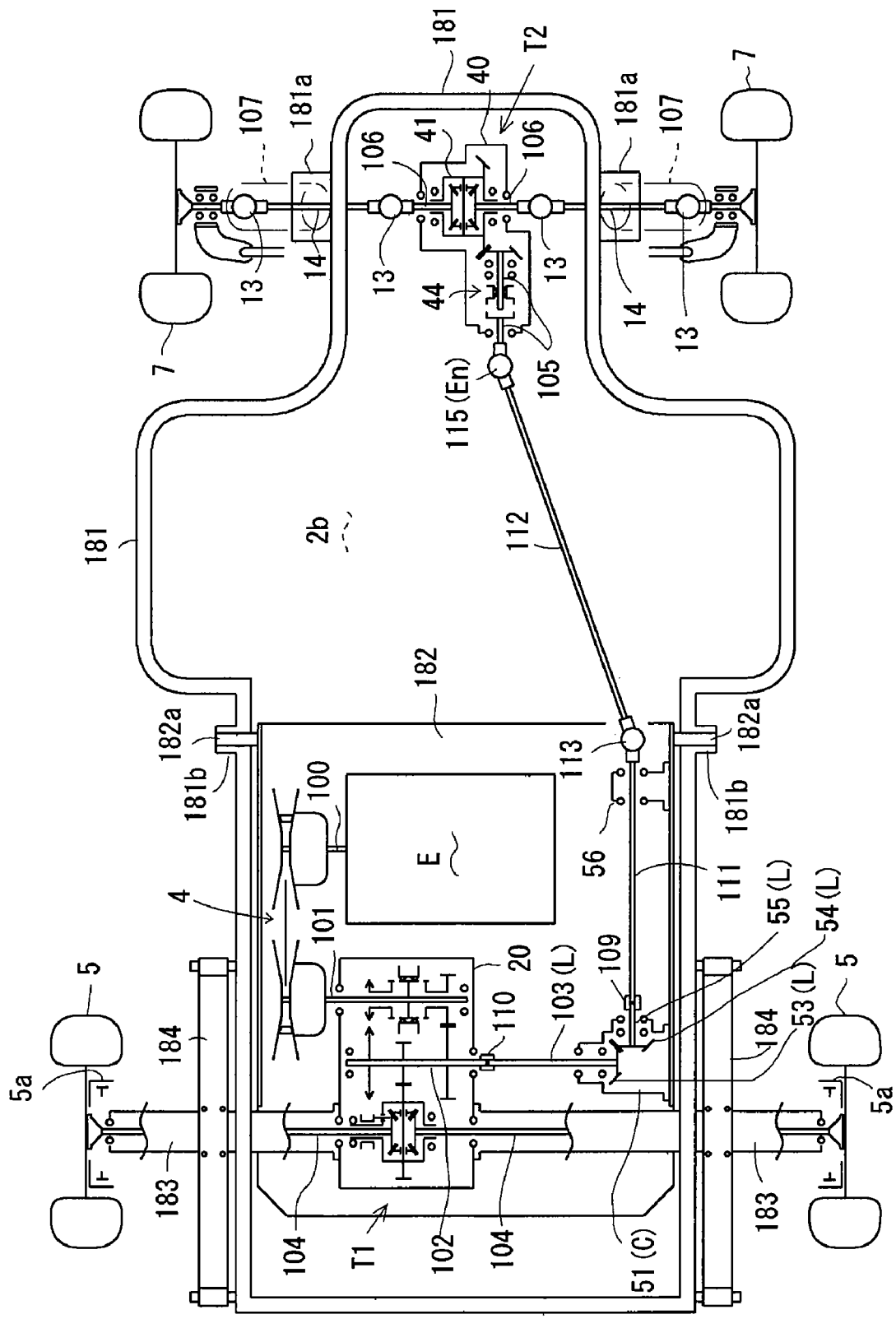
FIG. 21 is a schematic plan view of the cart or utility vehicle of FIG. 20.

Next, explanation will be given of the other embodiment concerning the rear wheel suspension of the cart or utility vehicle shown in FIGS. 20 and 21. The power take-off train between the transaxles T1 and T2 shown in FIGS. 20 and 21 is the same as that of the first embodiment. The rear wheel suspension of the cart or utility vehicle shown in FIGS. 20 and 21 uses the above-mentioned transmission direction changing part of the above-mentioned power take-off train. Especially, this rear wheel suspension construction is applicable to the first embodiment or the third embodiment, in which the transmission direction changing part is a universal joint. In addition, this rear wheel suspension construction is also applicable to the fourth or fifth embodiment, if the chain casing is rotatable centered on the sprocket shaft serving as the transmission direction changing part.

A frame 181 of the cart or utility vehicle is extended from the front end of the vehicle body to the rear end thereof. The front half portion of the frame 181 corresponds to the front frame 2 of the cart or utility vehicle in FIGS. 1 to 11, and is provided thereon with the front cover 2a and platform 2b, similarly to the above mentioned. A cargo deck 3 is supported on a base 182 corresponding to the rear frame 1. The base 182 comprises a horizontal bottom plate and vertical side plates provided upright on front, rear, left and right edges of the bottom plate. The engine B and the rear transaxle T1 are mounted on the bottom plate. The rear half portion of the frame 181 is extended so as to enclose the left, right and rear side plates of the base 182.

Pivot pins 182a project laterally outward from the left and right side plates of the base 182 near the front end thereof. The frame 181 has substantially vertically extended portions on the left and right sides of the pivotal support pins 182a. A rear portion of the frame 181 is extended rearward from the top ends of the substantially vertically extended portions so as to surround the base 182. A front portion of the frame 181 is extended forward below the platform 2b from the rear ends of the substantially vertically extended portions. As a result, the rear portion of the frame 181 is higher for a degree than the rear portion thereof. The left and right pivot pins 182a are rotatably inserted into respective left and right boss parts 181b formed on the left and right vertical extended portion of the frame 181. An extension line of the coaxial axes of the pivot pins 182a passes through the center of the universal joint 113 corresponding to the transmission direction changing part. Therefore, in the power take-off train, when the base 182 is vertically rotated centered on the pivot pins 182a, the bevel gear box 51 and the first propeller shaft 111 supported on the base 182 are rotated centered on the universal joint 113 relative to the universal joint 115 and the second propeller shaft 112 which are supported by the frame 181 through the front transaxle T2.

The left and right axles 104 are extended coaxially from the differential gear mechanism of the rear transaxle T1 to the rear wheels 5, and left and right axle casings 183 pivotally supporting the axles 104 are extended laterally from the housing 20. The axle casings 183 are extended outward from the left and right ends of the base 182. Plate springs (leaf springs) 184 are supported at the left and right outsides of the rear portion of the frame 181 and attached to the axle casings 183. Accordingly, the frame 181 is supported through the plate springs 184 vertically movably relative to the axle casings 183 supported by the base 182, that is, the rear wheels 5. Alternatively, coil springs may be used instead of the plate springs.

The suspending of the front wheels 7 is the same as that shown in FIGS. 18 and 19. Namely, left and right stays 181a, similar to the stays 171a, are provided on the front end of the frame 181, and the common suspension mechanisms 107, which comprise coil springs, shock absorbers and the like, are extended from the stays 181 a so as to hang the front wheels 7.

Next, explanation will be given on the sixth embodiment of the power take-off train shown in FIGS. 22 to 27. Explanation of the parts designated by the same reference numerals as those of the first embodiment is omitted because the parts are the same as those of the first embodiment.

In regard to the power take-off train of this embodiment, the housing 20 of the rear transaxle T1 is constructed by joining substantially laterally symmetrical left and right housing half parts 20L and 20R through a vertical joint surface. Circular flange parts 20b are formed on left and right side walls 20a of the half parts 20L and 20R around the bearings 33. The brakes 5b are disposed in the rims of the rear wheels 5. Alternatively, brakes, such as multi-disk wet type brake, may be disposed on the axles 104 inside the flange parts 20b.

One of the left and right differential cages 31L and 31R, opposite to the CVT 4 (in this embodiment, the right differential cage 31R), projects laterally outward from the flange part 20b. The rear transaxle T1 has an intermediate transmission shaft 202, which corresponds to the PTO shaft 102 of the first embodiment. However, in this embodiment, the outwardly extended differential cage 31R serves as the PTO shaft for transmitting power to the front transaxle T2. Namely, the boss part of the differential cage 31R is a hollow shaft 31a extended along the outer peripheral surface of the right axle 104R, and projected rightward from the right half part 20R.

A PTO casing 251 is attached onto the outer end of the flange part 20b of the right half part 20R, from which the differential cage 31R is inserted through the bearing 33 so as to serve as the PTO shaft. An input casing part 251a, a gear casing part 251b and an output casing part 251c are joined together to constitute the PTO casing 251. The input casing part 251a is interposed as a spacer between the flange part 20b of the housing 20 and the gear casing part 251b, and screwed to the flange part 20b through bolts 35 together with the gear casing part 251b. By adjusting the thickness of the input casing part 251a, the position of the later-discussed output shaft 55 can be determined pertinently along the width of the vehicle.

The input casing part 251a and the gear casing part 251b hold respective bearings 36, which are disposed coaxially to the right axle 104R so as to rotatably support an input bevel gear 253 therebetween. The gear 253 is formed with a laterally projecting boss part 253a penetrated by a hole whose axis is disposed on the rotation axis of the gear 253. The bearings 33 and 36 are disposed on the left and right outer peripheral surfaces of boss part 253a, and the right axle 104R is passed through the hole so as to penetrate the gear 253. The gear casing part 251b holds a bearing 37 and a seal member. The bearing 37 supports the outer side of the right axle 104R. Accordingly, the axle 104R penetrates the gear casing part 251b and is connected to the rear wheel axle 5a through the coupling 108. A female spline is formed on the inner peripheral surface of the boss part 253a facing to the differential cage 31R, and a male spline is formed on the tip of a hollow shaft 31a extended from the differential cage 31R, whereby the differential cage 31R is connected to the input bevel gear 253 by inserting the hollow shaft 31a into the boss part 253a.

An output bevel gear 254 is disposed in the output casing part 251c. The output bevel gear 254 is diametrically smaller than the input bevel gear 253. The output shaft 55 and the output bevel gear 254 are disposed so that their rotation axes are perpendicular to the axle 104R, and the output shaft 55 and the output bevel gear 254 are pivotally supported by the output casing part 251c so as to be rotatable relative to each other. The drive mode switching clutch 44 is interposed between the output bevel gear 254 and the output shaft 55, so as to selectively engage or disengage the output shaft 55 with and from the output bevel gear 254.

In this embodiment, the output casing part 251c is extended forward for driving the front wheels 7. Alternatively, the PTO casing 251 is attached to the housing 20 so as to be extended rearward for transmitting power to drive wheels and the like disposed behind the housing 20 and the PTO casing 251. Thus, the direction of the PTO casing 251 is not limited.

The acceleration ratio defined by the diametrically large bevel gear 253 and the diametrically small bevel gear 254 is substantially equal to the deceleration ratio of the deceleration gear train comprising the final pinion 27 and the bull gear 28 in the housing, so that the rotation speed of the output shaft 55 is substantially equal to that when the output shaft 55 is drivingly connected to the intermediate shaft 202 so as to rotate at the same speed of the intermediate shaft 202. Therefore, in this embodiment, the front transaxle T2 designed to be drivingly connected to the intermediate transmission shaft 202 can be also used without changing in design.

The bevel gear 254 always engages with the bevel gear 253 rotated integrally with the main drive axle 104. By engaging the clutch 44, the output shaft 55 is drivingly connected to the bevel gear 254, thereby transmitting power from the second transaxle T2 to the auxiliary drive axle 106 and the vehicle is turned into the four-wheel drive mode. By disengaging the clutch 44, power of the engine is transmitted from the main drive axle 104 to only the rear wheels 5, whereby the vehicle is driven in the two-wheel drive mode.

Figure 26:
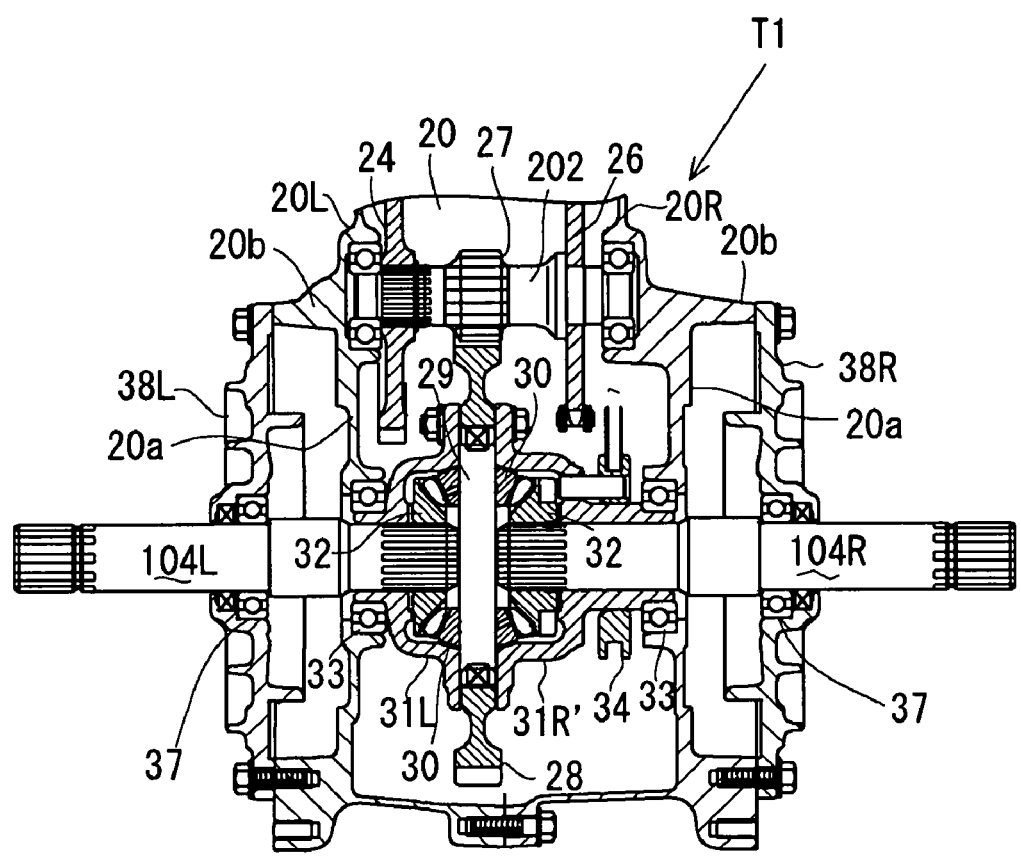
FIG. 26 is a sectional rear view of the transmission casing 20 of the rear transaxle T1, wherein the PTO casing 251 is not attached thereto.

With regard to the rear transaxle T1, the opening end of the flange part 20a (in this embodiment, of the left half 20L) opposite to the PTO casing 251 side is covered with a side cover 38L holding the bearing 37 and a seal member. The bearing 37 supports the outer end side of the left axle 104L. If the rear transaxle T1 is used for a two-wheel drive vehicle in which only the axles 104L and 104R of the rear transaxle T1 serve as drive axles, as shown in FIG. 26, the PTO casing 251 is not provided, and the opening ends of the flange parts 20b of the left and right halves 20L and 20R are covered with the respective side covers 38L and 38R, which hold the bearings 37 and the seal members. The bearings 37 in the respective side covers 38L and 38R support the respective outer side portions of the left and right axles 104L and 104R. Preferably, a portion the flange part 20b joined to the side cover 38R is designed (particularly, in regard to the bolt hole design in size and pitch) distance of attachment bolts) so as to be also joined to the PTO casing, so that the same housing 20 can be used without changing the construction of the halves 20L and 20R whether or not it is joined to the PTO casing 251.

In addition, in the case that the side covers 38 are attached to the left and right flange parts 20b, the differential gear mechanism in the rear transaxle T1 uses a differential cage 31R', which is shorter than the differential cage 31R integrally formed with the hollow shaft 31a projecting outward from the housing 20 to serve as the PTO shaft. The short differential cage 31R' has an outer end disposed within the bearing 33 held in a bearing wall 20a. Alternatively, the differential cage 31R; which is integrally formed with the hollow shaft 31a in the above embodiment, may be separably connected to a separate hollow shaft 31a serving as the PTO shaft. In this case, the differential case 31R can be selectively joined to the hollow shaft 31a or not depending to whether the vehicle is designed to be a four-wheel drive vehicle or a two-wheel drive vehicle.

Figure 27:
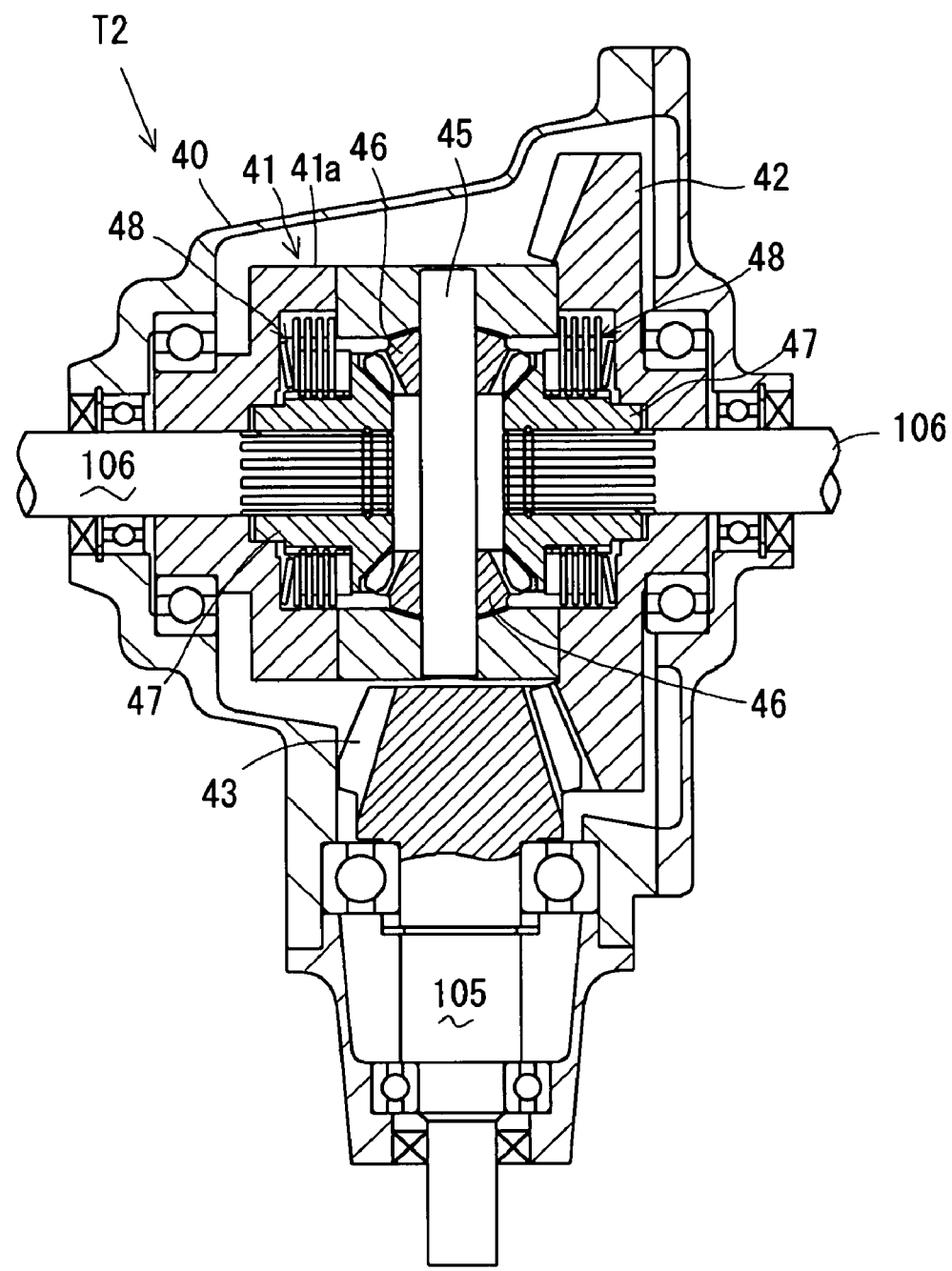
FIG. 27 is a sectional plan view of a housing 40 of a front transaxle T2.

Next, explanation will be given of an interior construction in the housing 40 of the front transaxle T2 according to FIGS. 22, 23 and 27. In the housing 40, the axles 106 are differentially connected to each other through a differential mechanism. The differential gear mechanism comprises a differential cage 41a, a differential pinion shaft 45 supported by the differential cage 41a, differential pinions 46 pivotally supported in the differential cage 41a through the differential pinion shaft 45, and differential side gears 47 fixed onto the inner ends of the axles 106 so that each of the differential side gears 47 engages with the differential pinions 46. Each of left and right limited slip differentials 48, which comprises a plurality of friction discs biased by springs, is interposed respectively between the differential cage 41a and each of the differential side gears 47, so as to restrict rotation of the axles 106 relative to the differential cage 41a. Accordingly, even if either one of the left and right front wheels 7 falls into a ditch, power is transmitted to not only the falling front wheel 7 but also the other front wheel 7, whereby the vehicle can escape from the ditch.

The input shaft 105 is pivotally supported longitudinally and extended rearward from the housing 40 so as to input power from the PTO casing 251. The bevel gear 43 is fixed onto the front end of the input shaft 105 and engages with the bull gear 42 fixed onto the differential cage 41a. The drive mode switching clutch 44 is disposed inside the PTO casing 251 in this embodiment. Alternatively, the clutch 44 may be disposed in the housing 40, such as on the input shaft 105.

Next, explanation will be given of the power take-off train from the rear transaxle T1 to the front transaxle T2 according to FIGS. 22 to 25 and 27. As mentioned above, the PTO casing 251 is attached to the side of the housing 20 of the rear transaxle T1 opposite to the CVT 4. The front end of the output shaft 55 is extended forward from the PTO casing 251 and drivingly connected to the rear end of the first propeller shaft 111 through the spline in the sleeve coupling 109, similar to the coupling 108. The first propeller shaft 111 is extended forward substantially horizontally, and the front end thereof is pivoted by the pillow block 56 provided upright on the bottom surface of the rear frame 1. Preferably, the pillow block 56 is disposed at substantially the same position as the front end of the engine E in the fore-and-aft direction and on the lateral side of the engine E opposite to the CVT 4.

The front end of the first propeller shaft 111 is drivingly connected to the second propeller shaft 112 through the universal joint 113 just before the pillow block 56. As shown in FIG. 23, the second propeller shaft 112 is extended just below the platform 2b of the front frame 2 substantially horizontally and laterally slantwise. The front end of the second propeller shaft 112 is connected through the universal joint 115 to the rear end of the input shaft 105 projected rearward from the housing 40 of the front transaxle T2. In addition, the input shaft 105 is disposed rightward from the lateral center of the vehicle body in the front transaxle T2 so as to reduce the lateral slant angle of the second propeller shaft 112 interposed between the input shaft 105 and the first propeller shaft 111 disposed on the right side of the engine E, thereby reducing vibration and noise,.

Figure 22:
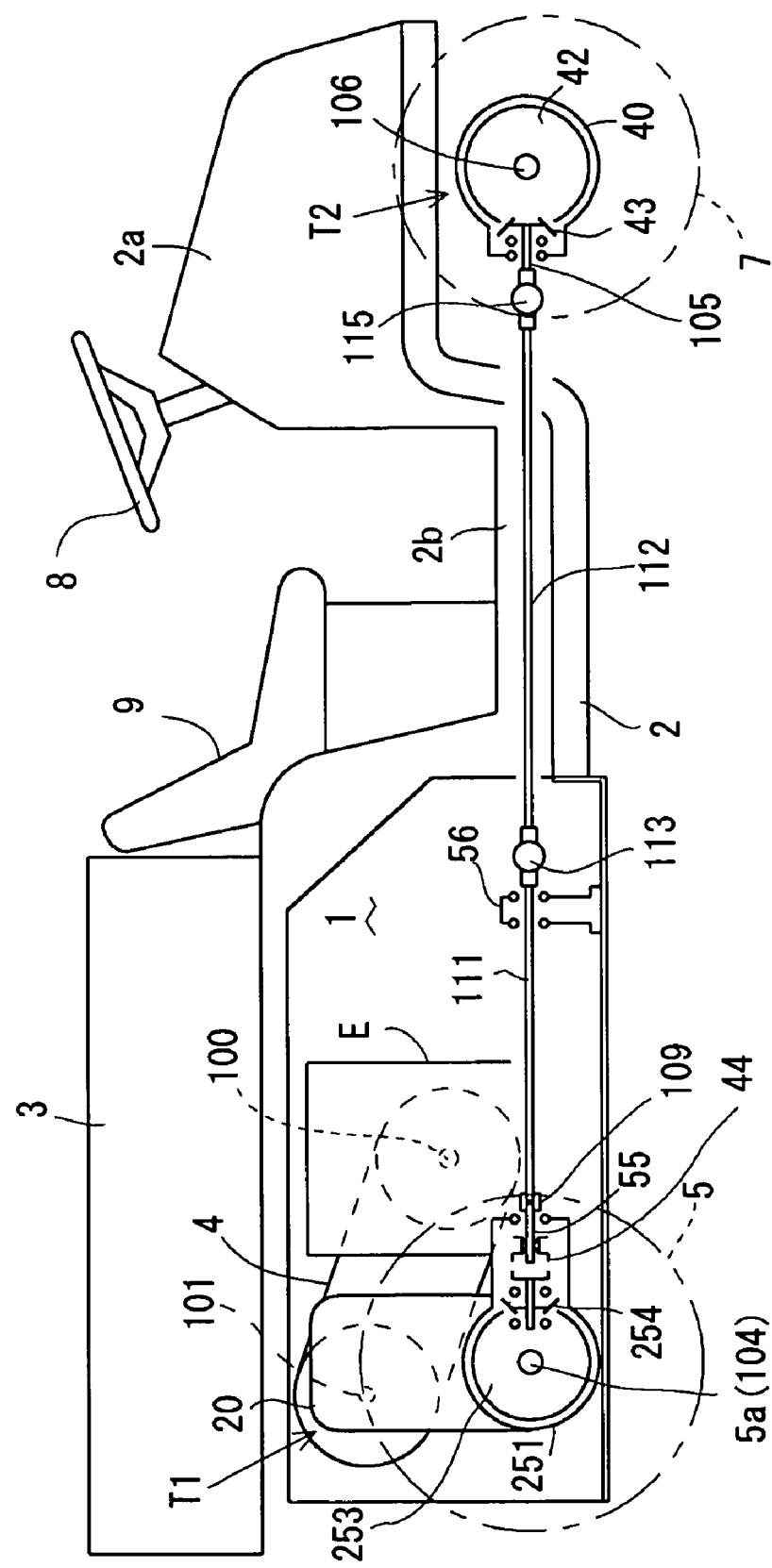
FIG. 22 is a schematic side view of a cart or utility vehicle having a power transmission system according to a sixth embodiment of the present invention.
Figure 23:
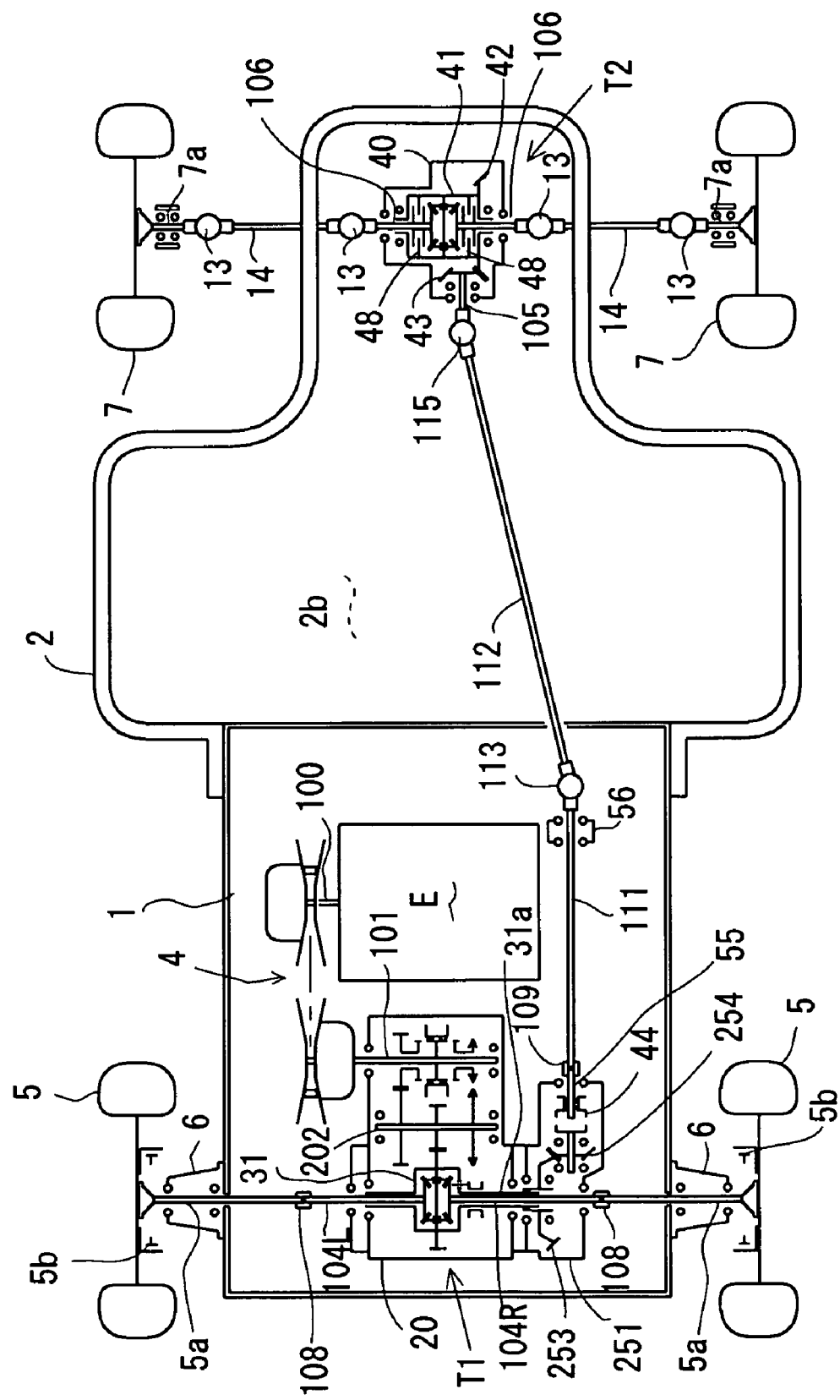
FIG. 23 is a schematic plan view of the cart or utility vehicle of FIG. 22.
Figure 24:
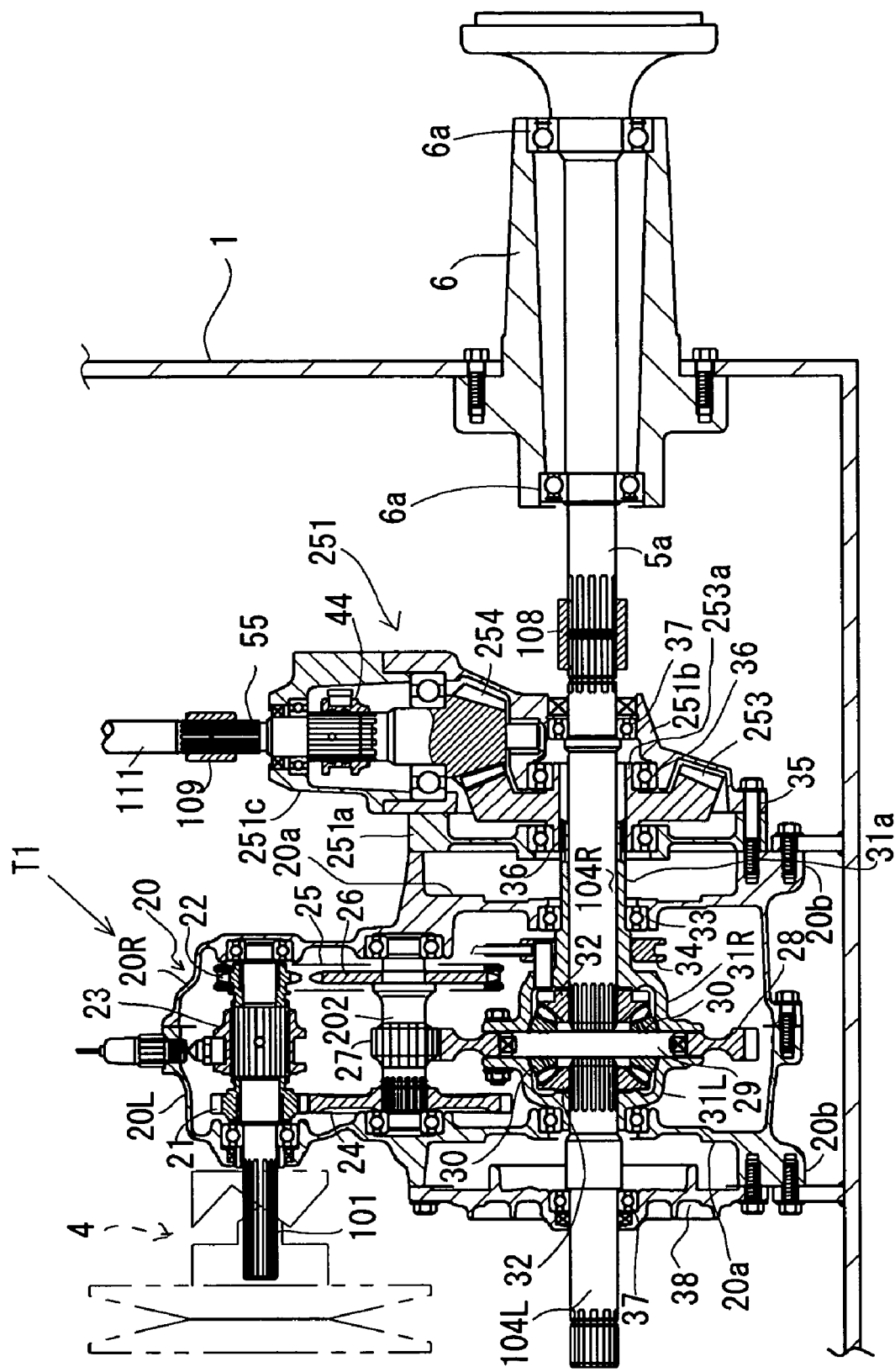
FIG. 24 includes a sectional rear view of a transmission casing 20 of the rear transaxle T1, a sectional rear view of an axle support member 6 supporting a rear axle 5*a* connected to a differential output shaft 104R supported by the transmission casing 20, and a sectional plan view of a PTO casing 251 attached to the transmission casing 20.
Figure 25:
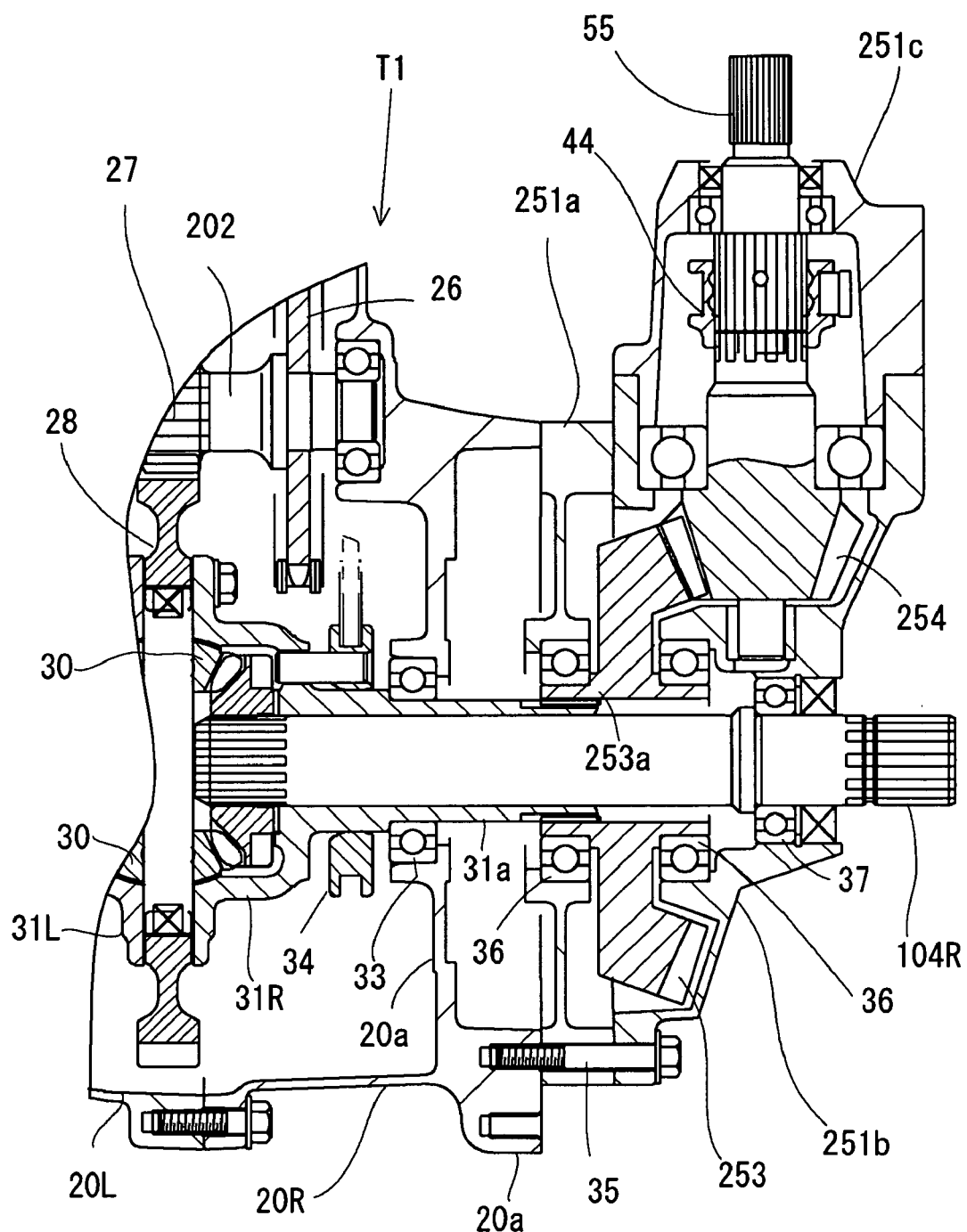
FIG. 25 is an enlarged sectional plan view of the PTO casing 251.

As the above, with regard to the four-wheel drive vehicle shown in FIGS. 22 and 23, at the rear portion of the vehicle, the CVT 4 is disposed on one of left and right sides (the left side) of the engine E and the housing 20 of the rear transaxle T1 behind the engine E so as to drivingly connect the rear transaxle T1 to the engine E, and the PTO casing 251 is attached to the flange end part 20b of the housing 20 supporting the right axle 104R on the lateral side (the right side) of the engine E and the housing 20 opposite to the CVT 4. The output shaft 55 pivotally supported by the PTO casing 251 is drivingly connected to the differential cage 31R extended along the outer peripheral surface of the right axle 104R. The first propeller shaft 111 is disposed on the right side of the engine E (laterally opposite to the CVT 4) so as to drivingly connect the output shaft 55 to the input shaft 105 of the front transaxle T2 at the front portion of the vehicle, through the second propeller shaft 112 and the universal joints 113 and 115. Accordingly, the height of the output shaft 55 is the same as the axle 104 at the lowest position in the rear transaxle T1, thereby reducing the vertical positional difference of the output shaft 55 from the propeller shaft 112 passing below the platform 2b, whereby the output shaft 55 can be connected to the propeller shaft 112 in a substantially straight way. In this regard, the universal joint 113 is bent when viewed in plan, however, the vertical bending angle of the universal joint 113, when viewed in side, is very small so as to reduce noise and vibration caused by the bending thereof, thereby improving comfort of the vehicle.

Figure 28:
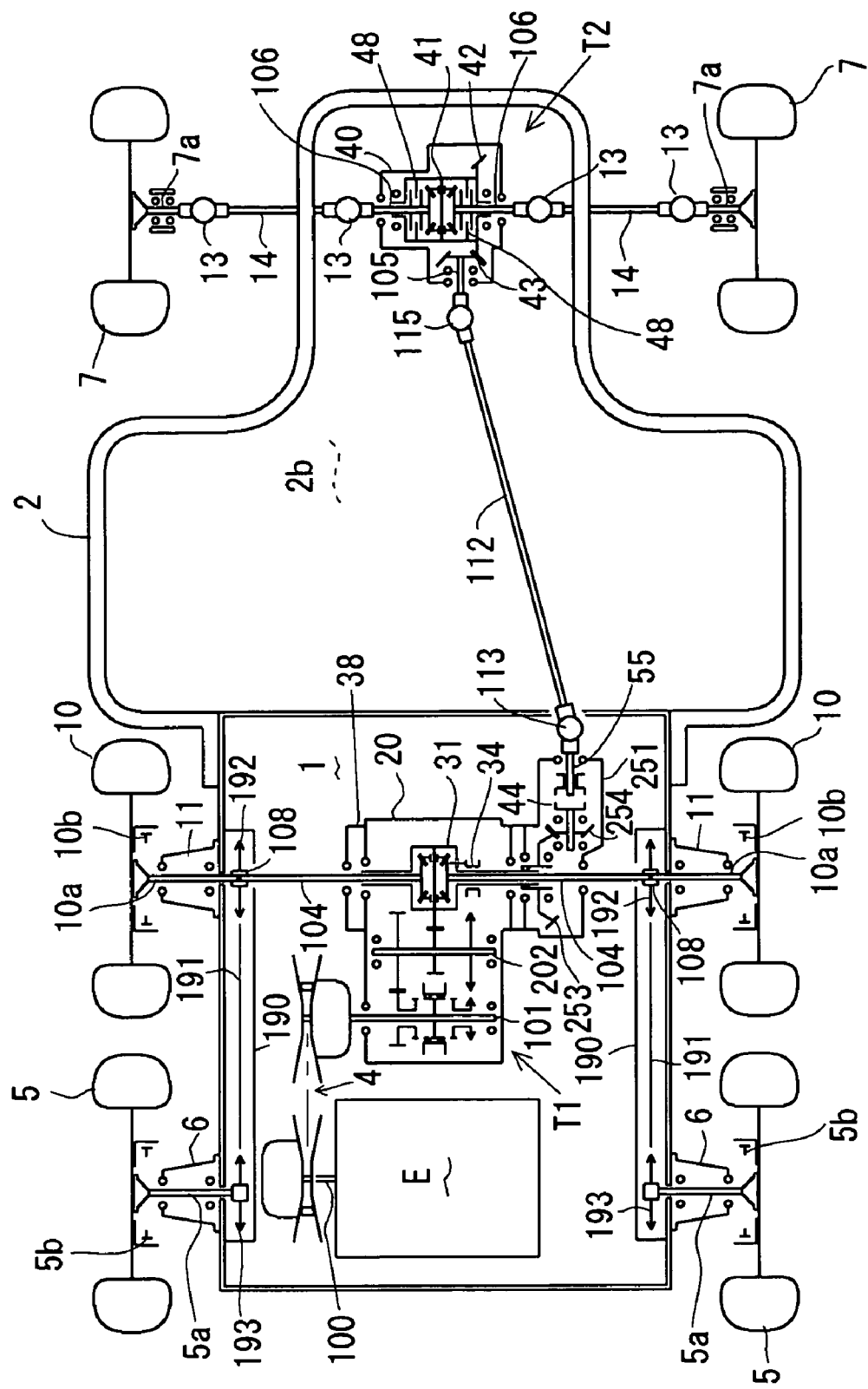
FIG. 28 is a sectional plan view of a six-wheel drive cart or utility vehicle according to another mode of the sixth embodiment of the present invention.

A multi-wheel drive vehicle other than the four-wheel drive vehicle, e.g., a six-wheel drive vehicle, as shown in FIG. 28, can be constructed by using the rear transaxle T1, having the housing 20 attached to the PTO casing 251, and the front transaxle T2.

With regard to the six-wheel drive vehicle in FIG. 28, the rear frame 1 supporting the left and right rear (first main drive) wheels 5 through the respective rear wheel axle support members 6 supports the left and right middle (second main drive) wheels 10 through the respective middle wheel axle support members 11 before the left and right rear wheels 9. The first transaxle T1 is disposed between the middle wheels 10. Middle wheel axles 10a, which are the axes of the middle wheels 10, are drivingly connected coaxially to the left and right axles 104 supported by the housing 20 of the first transaxle T1 through the couplings 108, similarly to the above mentioned. In addition, brakes 10b (drum type, dry single disk type, or so on) are provided on the respective rims of the left and right middle wheels 10, similar to the brakes 5b on the rims of the rear wheels 5.

The engine E is mounted on the rear frame 1 between the rear wheels 5, behind the first transaxle T1. The CVT 4 is interposed between the engine E and the housing 20 at the one of left and right sides (at the right side in this embodiment) of the engine E.

Similar to FIGS. 22 to 25, the PTO casing 251 is attached to the right side (the lateral opposite side to the CVT 4) of the first transaxle T1. The hollow shaft 31 a is integrally formed on the side wall of the differential cage 31R so as to serve as the PTO shaft. The power take-off train is extended from the PTO casing 251 to the second transaxle T2 for driving the left and right front (auxiliary drive) wheels 7, similar to those in the above-mentioned embodiments.

The chain transmission mechanism is provided for transmitting power from left and right axles 104 to the rear wheels 5. In this regard, a sprocket 192 is fixed on the coupling 108 between each of the middle wheel axles 10a and each of the left and right axles 104, and a sprocket 193 is fixed onto the inner end of each of the rear wheel axles 5a. A chain 191 is interposed between each of the sprockets 192 and each of the sprockets 193. Left and right chain casings 190 are attached to the respective left and right side plates of the rear frame 1 so as to cover the respective left and right chains 191 and sprockets 192 and 193.

Figure 29:
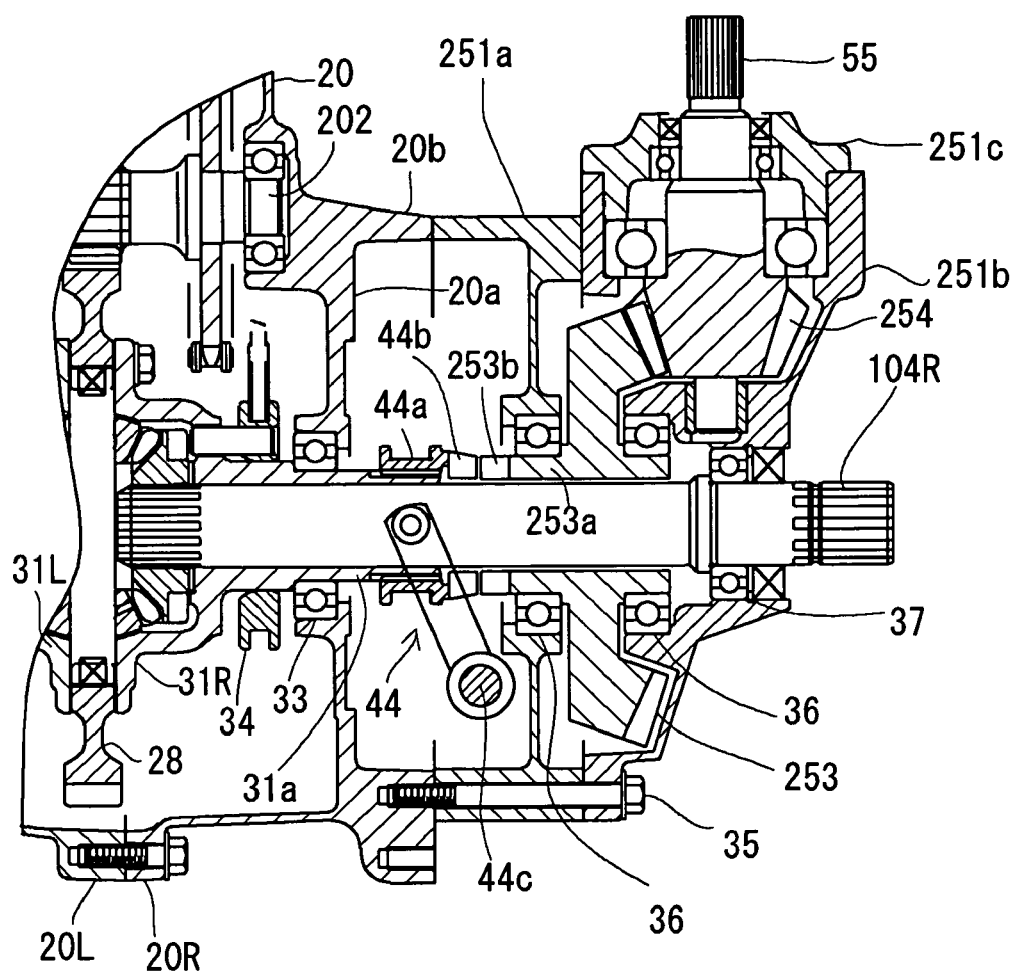
FIG. 29 is a sectional plan macrograph of the PTO casing 251, whose layout of a drive mode switching clutch 44 is changed.

In the sixth embodiment, the drive mode switching clutch 44 is provided at the output casing part 251c in the PTO casing 251. Alternatively, the drive mode switching clutch 44 may be disposed between the flange part 20b of the right half part 20R and the input casing part 251a, as shown in FIG. 29. In this regard, the hollow shaft 31a is at a distance from the boss part 253a of the input bevel gear 253 in the axial direction. A clutch slider 44a is not-relatively rotatably, but axially slidably, fitted on the end of the hollow shaft 31a. The clutch slider 44a has an end surface formed with a driving claw part 44b facing to the input bevel gear 253. On the other hand, a driven claw part 253b is provided on the end surface of the input bevel gear 253 facing to the driving claw part 44b. A clutch operation shaft 44c is supported by the input casing part 251a. By rotating the shaft 44c, an arm 44d actuates to axially slide the clutch slider 44a on the hollow shaft 31a, thereby engaging or disengaging the driving claw part 44b to or from the driven claw part 253b.

Figure 30:
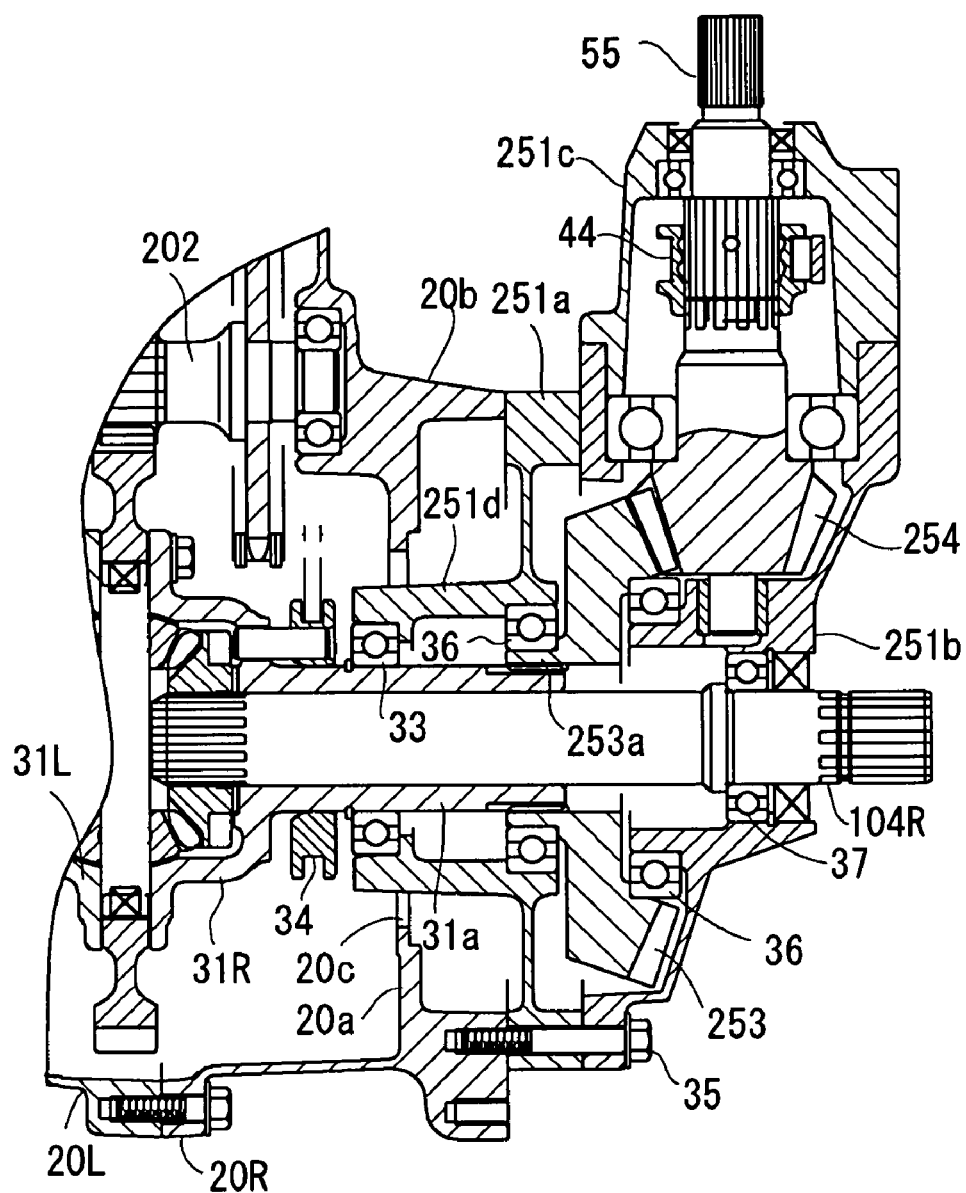
FIG. 30 is sectional plan macrograph of the PTO casing 251, whose form for supporting a hollow shaft 31*a* is changed.

The side wall 20a of the right half part 20R holds the bearing 33 for supporting the hollow shaft 31a. Alternatively, the input casing part 251a may holds the bearing 33, as shown in FIG. 30. In this regard, the input casing part 251a, which is connected to the flange part 20b of the right half part 20R, is formed thereon with a cylinder part 251d. The cylinder part 251d is extended coaxially to the right axle 104R toward the differential cage 31R. The side wall 20a of the right half part 20R is provided with an opening 20c, through which the cylinder part 251d is inserted into the rear transaxle (transmission) casing 20. The bearing 33 is supported in the end of the cylinder part 251d at substantially the same height as that of the first embodiment. Due to this construction, the hollow shaft 31 a can have some thickness, thereby enhancing the strength of the shaft 31a connected to the input bevel gear 253. If the rear transaxle T1 is designed to suit a two-wheel drive vehicle, a similar cylinder part for supporting the bearing 33 is formed on the side cover 38R shown in FIG. 26.

It is further understood by those skilled in the art that the foregoing description is a preferred embodiment of the disclosed system and that various changes and modifications may be made in the invention without departing from the spirit and scope thereof.

What is claimed is:

1. A vehicle power transmission system comprising:
   a prime mover mounted on a vehicle body frame;
   a first axle and a first transaxles for driving the first axle disposed at one of front and rear portions of a vehicle, the first transaxles having a first input part projecting outward therefrom, and the first trans axle having a power take-off shaft projecting outward therefrom opposite to the first input part;
   a speed-changing transmission drivingly interposed between the prime mover and the first input part;
   a second axle and a second transaxle for driving the second axle disposed at the other rear or front portion of the vehicle, the second axle having a second input part, wherein the prime mover is disposed between the first transaxles and the second transaxle in a fore-and-aft direction of the vehicle;
   a power take-off train extended from a leading part to an ending part, the leading part being drivingly connected to the power take-off shaft, and the ending part being drivingly connected to the second input part, wherein the leading part of the power take-off train is separated from the first transaxle and laterally offset from the prime mover; and
   a cabinet incorporating the leading part, wherein the cabinet is separated from the first transaxle.

2. The vehicle power transmission system as set forth in claim 1,
   wherein the cabinet is attached to one of left and right side-plate portions of the vehicle body frame.

3. The vehicle power transmission system as set forth in claim 2, wherein the cabinet is attached to the vehicle body frame through a vibration proof member.

4. The vehicle power transmission system as set forth in claim 1, wherein the cabinet is formed integrally with an axle support member supporting the first axle.

5. The vehicle power transmission system as set forth in claim 1, wherein the cabinet is fixed to an axle support member supporting the first axle so as to be movable along a longitudinal direction of the first axle.

6. The vehicle power transmission system as set forth in claim 1, wherein the leading part is drivingly connected to the power take-off shaft through a flexible coupling.

7. The vehicle power transmission system as set forth in claim 1, wherein the leading part is drivingly connected to the power take-off shaft through a universal joint.

8. A vehicle power transmission system comprising:
a prime mover mounted on a vehicle body frame;
a first axle and a first transaxles for driving the first axle disposed at one of front and rear portions of a vehicle, the first transaxles having a first input part projecting outward therefrom, and the first transaxles having a power take-off shaft projecting outward therefrom opposite to the first input part;
a speed-changing transmission drivingly interposed between the prime mover and the first input part;
a second axle and a second transaxles for driving the second axle disposed at the other rear or front portion of the vehicle, the second axle having a second input part, wherein the prime mover is disposed between the first transaxle and the second transaxles in a fore-and-aft direction of the vehicle: and a power take-off train extended from a leading part to an ending part, the leading part being drivingly connected to the power take-off shaft, and the ending part being drivingly connected to the second input part, wherein the leading part of the power take-off train is separated from the first transaxle and laterally offset from the prime mover, wherein the ending part is disposed lower than the leading part.

9. The vehicle power transmission system as set forth in claim 8, wherein the power take-off train is extended from the leading part to the ending part laterally inward of the vehicle body frame along a substantially slanted straight line.

10. The vehicle power transmission system as set forth in claim 8, the leading part comprising a bevel gear, and the ending part comprising an universal joint, wherein the power take-off train comprises a propeller shaft interposed between the leading part and the ending part.

11. The vehicle power transmission system as set forth in claim 10, wherein the propeller shaft is extended from the leading part to the ending part laterally inward of the vehicle body frame along a substantially slanted straight line.

12. The vehicle power transmission system as set forth in claim 8, the power take-off train further comprising:
a transmission direction changing part between the leading part and the ending part, in substantially the same height as the ending part.

13. The vehicle power transmission system as set forth in claim 12, wherein an operation part of the vehicle is disposed above a part of the power take-off train between the leading part and the ending part.

14. The vehicle power transmission system as set forth in claim 12, wherein a third axle is disposed near the transmission direction changing part so as to be driven by the transmission direction changing part inputting power from the power take-off train.

15. The vehicle power transmission system as set forth in claim 12, wherein, when viewed in plan, a first part of the power take-off train from the leading part to the transmission direction changing part is extended in a substantially fore-and-aft direction along one of left and right ends of the vehicle body frame, and a second part of the power take-off train from the transmission direction changing part to the ending part is extended laterally inwardly slantwise of the vehicle body frame.

16. The vehicle power transmission system as set forth in claim 12, wherein the leading part comprising a bevel gear, and the transmission direction changing part and the ending part comprising respective universal joints, wherein the power take-off train comprises: a first propeller shaft interposed between the leading part and the transmission direction changing part; and a second propeller shaft interposed between the transmission direction changing part and the ending part.

17. The vehicle power transmission system as set forth in claim 16, wherein the first propeller shaft is extended in a substantially fore-and-aft direction along one of left and right ends of the vehicle body frame, and the second propeller shaft is extended laterally inwardly slantwise of the vehicle body frame.

18. The vehicle power transmission system as set forth in claim 16, the vehicle body frame comprising:
a first frame part supporting the leading part; and
a second frame part supporting the ending part, the second frame part pivotally connected to the first frame part through a pivot, wherein an axis of the pivot passes through a center of the universal joint of the transmission direction changing part.

19. The vehicle power transmission system as set forth in claim 12, wherein, when viewed in plan, a first part of the power take-off train from the leading part to the transmission direction changing part and a second part of the power take-off train from the transmission direction changing part to the ending part are extended in a substantially fore-and-aft direction in parallel to each other.

20. The vehicle power transmission system as set forth in claim 12, the leading part, the ending part and the transmission direction changing part comprising:
respective sprocket shafts extended laterally of the vehicle body frame; and respective sprockets on the sprocket shafts, wherein a first chain is interposed between the leading part and the transmission direction changing part, and a second chain is interposed between the transmission direction changing part and the ending part.

21. The vehicle power transmission system as set forth in claim 20, wherein the first chain and the second chain are extended in a substantially fore-and-aft direction in parallel to each other.

* * * * *

UNITED STATES PATENT AND TRADEMARK OFFICE
CERTIFICATE OF CORRECTION

PATENT NO. : 7,357,210 B2
APPLICATION NO. : 11/097162
DATED : April 15, 2008
INVENTOR(S) : Akihiro Ima It is certified that error appears in the above-identified patent and that said Letters Patent is hereby corrected as shown below:

Column 26, lines 35, 36, and 47, please replace "first transaxles" with --first transaxle--.

Column 26, line 38, please replace "first trans axle" with --first transaxle--.

Column 27, lines 13, 15, and 16, please replace "first transaxles" with --first transaxle--.

Column 27, lines 21 and 25, please replace "second transaxles" with --second transaxle--.

Column 27, line 26, please replace "vehicle: and" with --vehicle; and--. Please also insert a paragraph break after the word "and" in column 27, line 26.

Signed and Sealed this

Twenty-third Day of September, 2008

JON W. DUDAS
*Director of the United States Patent and Trademark Office*